(12) United States Patent
Wang

(10) Patent No.: US 12,270,605 B1
(45) Date of Patent: Apr. 8, 2025

(54) DRYING APPARATUSES, DUST SEPARATION DEVICES, CRUSHING DEVICES, ORGANIC WASTE DISPOSAL SYSTEMS, AND OPERATING METHODS

(71) Applicants: Wei Wang, West Vancouver (CA); Nikki Yat Ning Wang, West Vancouver (CA)

(72) Inventor: Wei Wang, West Vancouver (CA)

( * ) Notice: Subject to any disclaimer, the term of this patent is extended or adjusted under 35 U.S.C. 154(b) by 0 days.

(21) Appl. No.: 18/913,348

(22) Filed: Oct. 11, 2024

(30) Foreign Application Priority Data

Feb. 27, 2024  (CN) .......................... 202410238508.9

(51) Int. Cl.
*F26B 3/347* (2006.01)
*B01D 53/02* (2006.01)
(Continued)

(52) U.S. Cl.
CPC .............. *F26B 3/347* (2013.01); *B01D 53/02* (2013.01); *B02C 18/0084* (2013.01);
(Continued)

(58) Field of Classification Search
CPC ... B09B 2101/70; F26B 17/107; F26B 25/007
See application file for complete search history.

(56) References Cited

U.S. PATENT DOCUMENTS 4,285,142 A * 8/1981 Suzuki .................. F26B 17/107
209/722
4,378,234 A * 3/1983 Suzuki ...................... B04C 3/04
55/459.3
(Continued)

FOREIGN PATENT DOCUMENTS

CN  102240662  11/2011
CN  103056145  4/2013
(Continued)

OTHER PUBLICATIONS

International Search Report, dated Nov. 20, 2024, received in International Application No. PCT/CA2024/051191.

*Primary Examiner* — Jared O Brown
(74) *Attorney, Agent, or Firm* — Davis Wright Tremaine LLP; Heather M. Colburn

(57) ABSTRACT

A drying apparatus, particularly suitable for disposing water-containing organic waste. The drying apparatus includes a drying chamber with a circular cross-section, where waste enters the drying chamber through a waste inlet and undergoes rotational movement within the drying chamber due to a negative pressure generated by an air pump. The air pump draws out airflow from the drying chamber through an air duct connected to the flow outlet, ensuring that the waste continues to rotate during the drying process. Additionally, the apparatus is equipped with a microwave generating device, which directs microwaves into the drying chamber either directly or via a microwave conduit to efficiently dry the waste. This design combines the cyclonic motion with microwave heating, significantly enhancing drying efficiency and ensuring that the waste is fully dried in a short time, making it particularly suitable for disposing organic residue that requires rapid drying.

20 Claims, 14 Drawing Sheets

(51) Int. Cl.
*B02C 18/00* (2006.01)
*B02C 18/12* (2006.01)
*B02C 18/16* (2006.01)
*B02C 18/18* (2006.01)
*B02C 18/24* (2006.01)
*B09B 3/35* (2022.01)
*B09B 3/40* (2022.01)
*B09B 3/50* (2022.01)
*B09B 101/70* (2022.01)
*F26B 17/10* (2006.01)
*F26B 25/00* (2006.01)

(52) U.S. Cl.
CPC ............ *B02C 18/12* (2013.01); *B02C 18/182* (2013.01); *B02C 18/24* (2013.01); *B09B 3/35* (2022.01); *B09B 3/40* (2022.01); *B09B 3/50* (2022.01); *F26B 17/107* (2013.01); *F26B 25/007* (2013.01); *B01D 2253/102* (2013.01); *B01D 2253/108* (2013.01); *B01D 2258/02* (2013.01); *B02C 2018/162* (2013.01); *B09B 2101/70* (2022.01)

(56) References Cited

U.S. PATENT DOCUMENTS

| | | | |
|---|---|---|---|
| 5,269,637 A * | 12/1993 | Gomes, Jr. | B04C 1/00 |
| | | | 406/173 |
| 8,485,459 B2 | 7/2013 | Gomez | |
| 11,590,544 B2 | 2/2023 | Wang | |
| 2012/0261320 A1 | 10/2012 | Slanina | |
| 2018/0017325 A1* | 1/2018 | Chisholm | F26B 17/107 |

FOREIGN PATENT DOCUMENTS

| | | | | |
|---|---|---|---|---|
| CN | 109489348 A | * | 3/2019 | ............. F26B 11/14 |
| CN | 113714263 | | 11/2021 | |
| CN | 218532284 | | 2/2023 | |
| CN | 117884458 | | 4/2024 | |
| JP | H05-256574 | | 10/1993 | |
| JP | 2010194382 A | * | 9/2010 | |
| WO | WO-9835756 A1 | * | 8/1998 | ............. B02C 13/08 |

* cited by examiner

DRYING APPARATUSES, DUST SEPARATION DEVICES, CRUSHING DEVICES, ORGANIC WASTE DISPOSAL SYSTEMS, AND OPERATING METHODS

CROSS-REFERENCE TO RELATED APPLICATIONS

The present application claims priority to Chinese Application No. 202410238508.9, filed on Feb. 27, 2024, which is hereby incorporated by reference in its entirety.

TECHNICAL FIELD

The present disclosure relates to systems and methods for disposing organic waste, particularly to discrete, nodal systems and their operating methods for disposing organic waste such as kitchen waste or feces using crushing and microwave drying.

BACKGROUND

With the acceleration of urbanization and population growth, the disposal of organic waste has become an urgent problem to address. If organic waste, such as kitchen waste and feces, is not properly handled, it can lead to environmental pollution and serious public health issues. However, current organic waste disposal technologies have many limitations.

Firstly, the treatment of kitchen waste and feces is particularly urgent in remote areas and wilderness where sewer systems are not widespread. Traditional disposal methods primarily rely on composting, landfilling, and incineration. These methods are not only inefficient but also have certain negative environmental impacts. For example, the composting process is slow and requires a large amount of land resources, landfilling can generate leachate and greenhouse gases, while incineration may produce harmful gases and secondary pollution.

Secondly, existing organic waste disposal systems are usually bulky. For instance, urban sewage pipeline systems and municipal waste collection systems are often characterized by high construction costs and complex operation, with a centralized network structure. Their equipment is energy-intensive, with long processing times, making it difficult to meet the modern demand for efficient and environmentally-friendly disposal technologies. Many disposal systems have low efficiency in separating organic matter from water, resulting in poor quality of the final product. Additionally, in some cases, these systems require complex pre-treatment steps, adding to the complexity and cost of operations.

Therefore, developing a highly efficient, environmentally-friendly organic waste disposal technology that is suitable not only for urban areas but also for remote regions and wilderness environments is of significant practical importance and has promising application prospects.

SUMMARY

According to one aspect of the disclosure, there is provided a drying apparatus, comprising a drying chamber having a substantially circular or polygonal cross-section, and including a waste inlet for introducing an intake airflow and to-be-dried organic waste into the drying chamber, the waste inlet positioned radially offset from an axis of the substantially circular or polygonal cross-section such that the to-be-dried organic waste cyclonically rotates around the axis; a flow outlet for discharging a first airflow, positioned on or near the axis of the substantially circular or polygonal cross-section; and a discharge outlet for discharging dried organic waste, and radially offset from the axis of the substantially circular or polygonal cross-section. The drying apparatus further includes an air pump fluidly coupled to the flow outlet and configured to generate a negative pressure in the drying chamber, thereby causing the intake airflow and the to-be-dried organic waste to enter the drying chamber through the waste inlet and to maintain a cyclonic rotational movement of the to-be-dried organic waste within the drying chamber, while the first airflow is drawn out of the drying chamber through the flow outlet. The drying apparatus further includes a microwave inlet for coupling to a microwave generating device, the microwave inlet providing a microwave pathway into the drying chamber for microwaves to contact and dry the to-be-dried organic waste cyclonically rotating therein.

In some embodiments, the drying apparatus may further comprise a waste inlet valve disposed in a waste channel fluidly coupled to the waste inlet and configured to regulate a flow rate of the intake airflow entering the drying chamber through the waste inlet by an amount of opening.

In some embodiments, a discharge channel coupled to the discharge outlet may be oriented to extend in a direction substantially opposite to gravity, and the waste channel may be oriented to extend in a direction substantially perpendicular to the discharge channel, and optionally a stirring device may be provided in the drying chamber at or near an intersection of extension lines of the waste channel and the discharge channel.

In some embodiments, the drying apparatus may further comprise a dried waste separation chamber fluidly coupled to the discharge channel configured to receive a second airflow and the dried organic waste, wherein the dried waste separation chamber further comprises a housing having an air inlet that is fluidly coupled to the discharge channel, an air outlet, and a dust outlet, wherein the air inlet and the air outlet may be arranged at or near a top of the housing, and the dust outlet may be arranged at or near a bottom of the housing; and a labyrinth structure comprising a plurality of stages inside the housing, wherein each of the plurality of stages comprises a baffle extending upwards from the bottom of the housing and spaced from the top of the housing to define an airflow pathway to an adjacent stage; and at least one angled airflow deflector, and wherein the plurality of stages comprises a first stage in fluid communication with the air inlet, and a last stage in fluid communication with the air outlet.

In some embodiments, the drying apparatus may further comprise a storage chamber coupled to the dust outlet of the dried waste separation chamber for receiving and storing the dried organic waste.

In some embodiments, the drying chamber may be cylindrically shaped, and the flow outlet may be positioned at an axial center of one end of the drying chamber.

In some embodiments, the drying apparatus may further comprise a dust separation chamber fluidly coupled to the flow outlet and configured to receive the first airflow from the flow outlet, wherein the dust separation chamber further comprises a housing having an air inlet that is fluidly coupled to the flow outlet, an air outlet, and a dust outlet, wherein the air inlet and the air outlet may be arranged at or near a top of the housing, and the dust outlet may be arranged at or near a bottom of the housing; and a labyrinth structure comprising a plurality of stages inside the housing, wherein each of the plurality of stages comprises a baffle extending upwards from the bottom of the housing and spaced from the top of the housing to define an airflow pathway to an adjacent stage; and at least one angled airflow deflector, and wherein the plurality of stages comprises a first stage in fluid communication with the air inlet, and a last stage in fluid communication with the air outlet.

In some embodiments, the dust separation chamber may include a dust outlet in fluid communication with the waste channel, such that the dust may re-enter the drying chamber through the waste channel, and optionally the dust separation chamber may comprise a humidity sensor in communication with the first airflow.

In some embodiments, the drying apparatus may further comprise an exhaust gas filtering device for receiving the first airflow, wherein the exhaust gas filtering device may include a tank containing at least one of activated carbon or zeolite for purifying the first airflow.

According to another aspect of the disclosure, there is provided a dust separation device, comprising a housing having an air inlet, an air outlet, and a dust outlet, wherein the air inlet and the air outlet may be arranged at or near a top of the housing, and the dust outlet may be arranged at or near a bottom of the housing; and a labyrinth structure comprising a plurality of stages inside the housing, wherein each of the plurality of stages comprises a baffle extending upwards from the bottom of the housing and spaced from the top of the housing to define an airflow pathway to an adjacent stage; and at least one angled airflow deflector, and wherein the plurality of stages comprises a first stage in fluid communication with the air inlet, and a last stage in fluid communication with the air outlet.

In some embodiments, the dust separation device may comprise a pivotable door provided beneath the baffle and configured to remain in a vertical orientation when no negative pressure is applied at the dust outlet, and to flip upward when the negative pressure is applied at the dust outlet to abut against an adjacent baffle or against the housing, thereby forming a dust channel at the bottom of the housing for drawing dust from the bottom of the housing through the dust outlet.

In some embodiments, the air inlet and the air outlet may be arranged on a top surface of the housing, and optionally the dust outlet may be arranged on a side surface of the housing.

In some embodiments, the air inlet and the air outlet may be positioned at opposite ends on the top surface of the housing.

According to another aspect of the disclosure, there is provided a crushing device for separating organic waste into organic solid residue and a free liquid, comprising at least two screw shafts positioned in parallel and rotatable in opposite helical directions, wherein an upstream portion of each of the at least two screw shafts comprises intermeshing teeth for crushing the organic waste, and wherein a downstream portion of each of the at least two screw shafts comprises offset screw threads for compressing the crushed organic waste and forming the organic solid residue and the free liquid; and a chamber containing the at least two screw shafts and comprising a solids inlet for receiving the organic waste and positioned above the upstream portion of the at least two screw shafts; a liquid outlet for discharging the free liquid and positioned below the at least two screw shafts; and a residue outlet for discharging the organic residue and located below the downstream portion of the at least two screw shafts.

According to another aspect of the disclosure, there is provided a crushing device for separating organic waste into organic solid residue and a free liquid, comprising a cylindrical chamber comprising a solids inlet, a liquid outlet, and a residue outlet; a rotating shaft arranged along an axis of the cylindrical chamber; and a plurality of discs coaxially mounted on the rotating shaft below the solids inlet and above the liquid outlet and the residue outlet, with at least one disc having a plurality of disc teeth on its circumferential perimeter, wherein a plurality of wall teeth may be provided on an inner wall of the cylindrical chamber and may be vertically offset with at least some of the disc teeth to crush the organic waste supplied through the solids inlet and form the organic residue and the free liquid, and wherein the organic residue may be discharged through the residue outlet and the free liquid may be discharged through the liquid outlet.

In some embodiments, during operation, the rotating shaft may be vertically oriented and the solid inlet may be positioned at a top end of the crushing device.

In some embodiments, each of the plurality of discs may be provided with a plurality of disc teeth, and diameters of the discs may increase sequentially from top to bottom along the vertical direction.

In some embodiments, adjacent discs of the plurality of discs may rotate in opposite directions.

In some embodiments, the plurality of discs may comprise at least three discs, and at least one of the discs may be engaged with the rotating shaft via a planetary gear, such that a rotational direction of the at least one disc may be opposite to that of its adjacent disc, with their angular velocities being different.

In some embodiments, the liquid outlet may be located below the disc teeth of the lowest one of the plurality of discs.

In some embodiments, the residue outlet may be provided on the inner wall of the cylindrical chamber, positioned below the lowest one of the plurality of discs and above the liquid outlet, and wherein the residue outlet may be operable to open or close, such that the residue outlet remains closed when a crushing of the organic waste is being carried out and opens after the crushing of the organic waste is completed.

In some embodiments, the crushing device may further comprise a rotating paddle disc located below the lowest one of the plurality of discs, the rotating paddle disc may comprise at least one paddle, such that when the residue outlet is open, a rotation of the rotating paddle disc may discharge the organic residue from the cylindrical chamber through the residue outlet.

According to another aspect of the disclosure, there is provided an organic waste disposal system, comprising the crushing device as described herein; and the drying apparatus as described herein, wherein the to-be-dried organic waste to be received by the waste inlet of the drying apparatus is the to-be-dried organic residue directed from the residue outlet of the crushing device.

According to another aspect of the disclosure, there is provided a method for disposing organic waste, comprising crushing and dehydrating the organic waste to form to-be-dried organic residue and liquid; cyclonically rotating the to-be-dried organic residue in the drying chamber of the drying apparatus as described herein; and directing microwaves to the cyclonically rotating to-be-dried organic residue thereby producing dried organic residue.

In some embodiments, the method may further comprise, in response to detecting that a humidity of the first airflow is below a predetermined threshold, opening the discharge outlet of the drying apparatus to discharge the dried organic residue.

This summary does not necessarily describe the full scope of all aspects. Other aspects, features and advantages will become apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

The present disclosure provides an efficient organic waste disposal system that achieves high-efficiency processing of organic waste, such as kitchen waste and feces, by combining the principles of cyclonic motion and microwave drying.

Firstly, the novel drying chamber provided by this disclosure employs the cyclonic principle, ensuring that waste maintains rotational movement during the drying process. Through the negative pressure generated by the air pump, the intake airflow and the to-be-dried organic residue rotate in a cyclonic manner along the circular cross-section of the drying chamber. This rotational movement enables the even distribution of microwave energy, significantly improving drying efficiency and ensuring that the waste can be fully dried in a short period of time.

Secondly, the fine dust particles generated during the drying process are carried out of the drying chamber by the negative pressure. When drying feces, these dust particles may emit odors. Therefore, this disclosure provides a novel secondary dust filtering structure, namely, a dust separation device. This device utilizes a multi-stage labyrinth structure and gravity to allow the dust particles to naturally settle, thereby ensuring that the airflow leaving the separation device is free of dust particles and preventing the emission of odors.

Furthermore, the dust particles separated by the dust separation device can be redirected back into the drying chamber, forming a closed-loop system. The design of this closed-loop ensures that all dust particles are only discharged once the humidity has decreased to a certain level. This design enhances the overall drying effect and efficiency of the system.

The many beneficial effects of the present disclosure will be fully demonstrated in the following embodiments. Each embodiment will detail the specific structures and operating methods of the disclosure, showcasing how innovative design achieves efficient organic waste disposal. Additionally, each embodiment will further reveal the significant advantages of the disclosure in improving processing efficiency, reducing environmental pollution, and lowering operational costs.

Figure 1:
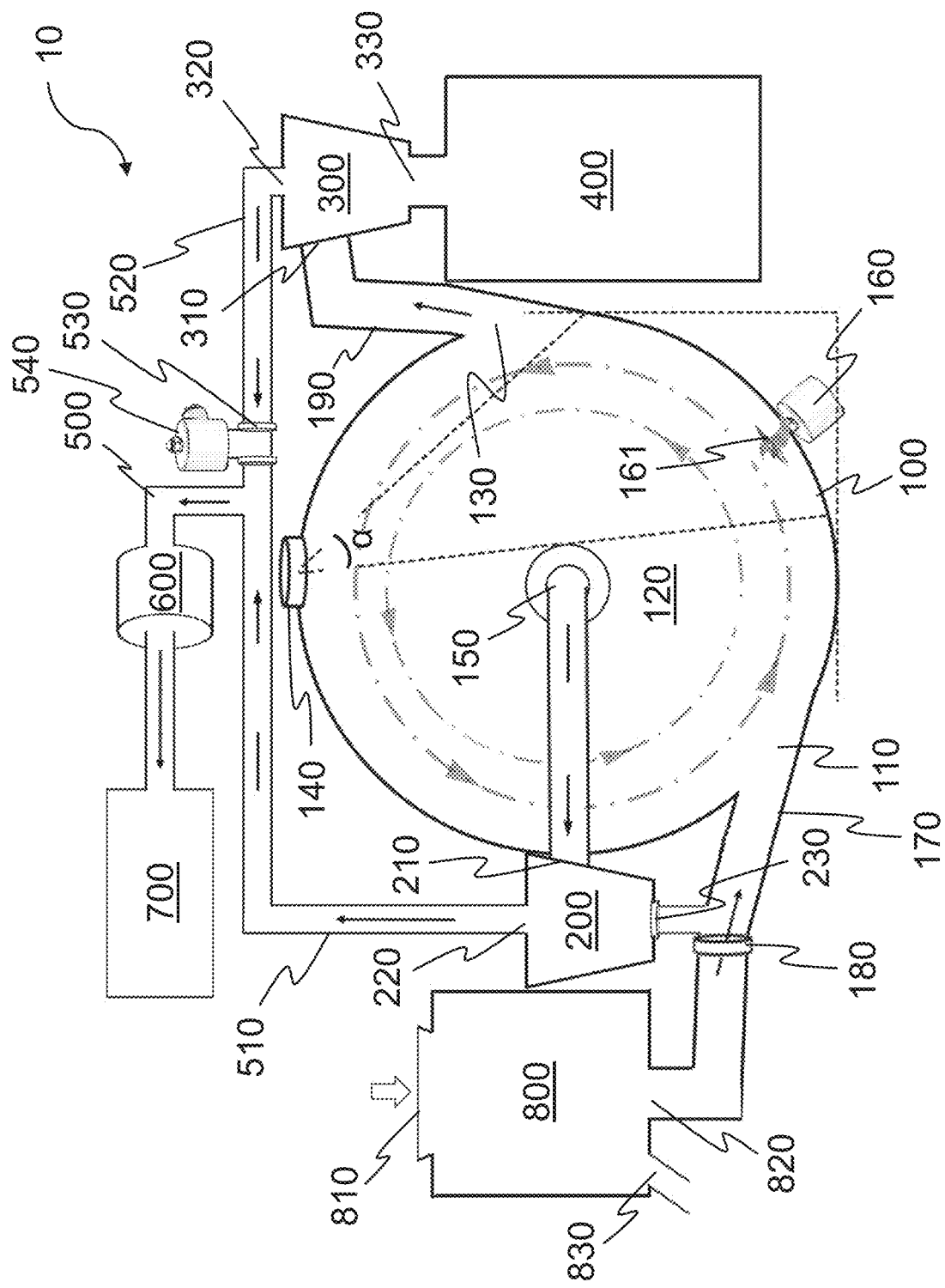
FIG. 1 is an overall schematic view of an organic waste disposal system according to one embodiment of the present disclosure.

Referring to FIG. 1, it illustrates a schematic overview of an organic waste disposal system 10 according to an embodiment of the present disclosure.

At the center of FIG. 1 is a drying apparatus 100, which includes a drying chamber 120. The drying chamber 120 is configured with a circular cross-section, ensuring that the to-be-dried material can maintain rotational movement within the drying chamber 120 under the influence of a cyclonic effect. For example, as indicated by the dashed arrows within the drying chamber 120 in FIG. 1, the material rotates in the direction shown. The drying apparatus 100 is equipped with a waste inlet 110 radially offset from an axis of the cross section of the drying chamber. The waste inlet 110 may be positioned near the bottom of the drying chamber 120 to receive waste to be dried that is introduced into the drying chamber 120 via a waste channel 170. The waste inlet 110 may be positioned substantially tangential to the outer surface of the circular cross-section of the drying chamber 120, allowing the waste to immediately begin to rotate in the circumferential direction upon entering the drying chamber 120.

It should be understood that, while FIG. 1 depicts the drying chamber with a circular cross-section, the chamber does not necessarily have to be perfectly circular in shape. Substantially circular or polygonal shapes, such as hexagonal or octagonal, are also contemplated, provided that the configuration allows the waste to form a cyclonic movement within the drying chamber around an axis for ensuring uniform drying and preventing accumulation of waste material on the chamber walls. The design flexibility permits various cross-sectional shapes that can achieve similar functional outcomes, accommodating different manufacturing preferences and spatial constraints. Accordingly, such variations should be construed as falling within the scope of the term "circular cross-section" as used herein.

At the other end of the waste channel 170 is a crushing device 800, which is used to crush larger organic waste into smaller pieces or residue. The crushing device 800 includes a solid inlet 810 for receiving organic waste, such as kitchen waste or feces. Typically, organic waste contains free liquid, such as water, which can be discharged through a liquid outlet 830 after entering the crushing device 800. The remaining solid residue, after being crushed, is discharged from the residue outlet 820 of the crushing device 800 and enters the waste channel 170. This solid residue still contains a significant amount of moisture, although it is not in a free form. This moisture needs to be separated from the residue after drying to obtain dried organic residue.

In one embodiment, a waste inlet valve 180 may be provided in the waste channel 170. The waste inlet valve 180 can be operably opened and closed to control the speed of the airflow entering the drying chamber 120. The smaller the opening of the waste inlet valve 180, the faster the airflow enters the drying chamber 120; conversely, the larger the opening, the slower the airflow. For example, when drawing the crushed residue into the drying chamber 120, the waste inlet valve 180 can be kept fully open to prevent residue from remaining in the waste channel 170. After the residue enters the drying chamber 120 and begins rotating within it, the opening of the waste inlet valve 180 can be reduced to increase the rotational speed of the airflow within the drying chamber 120. In one embodiment, the waste inlet valve 180 can be configured like a camera aperture, allowing for multiple settings corresponding to different openings.

Returning to the drying apparatus 100, it also includes a microwave inlet 140. A microwave generating device (not shown) can be directly mounted to the microwave inlet 140 or connected via a microwave pathway. The microwave generating device can produce microwaves of a certain power, which are emitted into the drying chamber 120 through the microwave inlet 140. In FIG. 1, the emission angle α of the microwaves from the microwave inlet 140 into the drying chamber can be set to any angle within a range of, for example, 30° to 90°. In one example, the emission angle of the microwaves can be adjusted to directly irradiate approximately one-quarter of the circumferential inner wall of the drying chamber 120, particularly the circumferential inner wall facing the waste inlet 110. Since residue tends to accumulate at this location due to gravity, irradiating this area with microwaves can enhance the drying effect. Alternatively, a stirring device 161 may be arranged on the circumferential inner wall facing the waste inlet 110, driven by a stirring motor 160. The stirring device 161 can be rotating blades, stirring rods, or any other device capable of agitating or chopping the accumulated organic residue.

A flow outlet 150 is provided on or near the rotational axis around which the residue rotates within the drying chamber 120. The flow outlet 150 is connected via a section of an air duct 500 to a dust separation chamber 200. The air leaving the drying chamber 120 may carry small dust particles, and the dust separation chamber 200 is used to further separate these dust particles from the air. Specifically, when the drying target is feces, the fine dust leaving the drying chamber 120 may contaminate an exhaust gas filtering device 700, leading to unpleasant odors. To prevent this, the dust settles in the dust separation chamber 200, and the filtered air exits via a first branch pipe 510 of the air duct 500. The settled dust accumulates at the bottom of the dust separation chamber 200 and can fall back into the waste channel 170 or directly into the drying chamber 120 due to gravity when a dust outlet 230 of the dust separation chamber 200 is opened.

The first branch pipe 510 is connected to an air pump 600. When operating, the air pump 600 generates negative pressure, creating an airflow path from the solid inlet 810 through the waste channel 170, drying chamber 120, flow outlet 150, dust separation chamber 200, and the first branch pipe 510. The air ultimately enters the exhaust gas filtering device 700, which can be a tank containing a certain amount of water, with activated carbon and/or zeolite placed in the water for purifying the air, such as removing odors from the air.

The negative pressure generated by the air pump 600 allows the residue in the drying chamber 120 to continuously rotate, and under the irradiation of microwaves, the moisture in the residue can surprisingly evaporate quickly. The loop formed by the drying chamber 120 and the dust separation chamber 200 ensures that the residue, regardless of size, is maximally returned to the drying chamber 120, so that the exiting airflow contains only moisture without residue. Advantageously, a humidity sensor (not shown) can be provided along the path of the air duct 500, for example, within the dust separation chamber 200. If a humidity sensor is provided, a threshold can be preset at about 1%-5%, for example. When the humidity sensor detects that the humidity of the airflow falls below this threshold, it indicates that the moisture in the residue has been mostly removed, and the microwave generation can be stopped.

The drying apparatus 100 is also provided with a discharge outlet 130. A discharge channel 190 is coupled at one end to the discharge outlet 130, and at the other end, it is coupled via a dried waste separation inlet 310 to a dried waste separation chamber 300. The dried waste separation chamber 300 is used to separate the dried residue from the air, so that the dried residue can enter the storage chamber 400 through the dried waste separation dust outlet 330 and be stored therein, while the airflow no longer carrying residue enters the second branch pipe 520 of the air duct 500 through the dried waste separation air outlet 320 and finally enters the exhaust gas filtering device 700 via the air pump 600. It should be understood that the storage chamber 400 may not be part of the organic waste disposal system 10, for example, it can be a detachable collection box.

In one embodiment, the discharge channel 190 may be substantially tangentially coupled to the discharge outlet 130 relative to the outer surface of the circular cross-section of the drying chamber 120 and oriented to extend in a direction substantially opposite to gravity, for example, at an angle of 0 to 30 degrees from vertical. Optionally, the waste channel 170 may be oriented to extend in a direction substantially perpendicular to the discharge channel 190, for example, at an angle of 70 to 110 degrees relative to the discharge channel 190. This arrangement ensures that during rotational drying, residue must pass through the microwave-illuminated area of the drying chamber 120 before reaching the discharge outlet 130, and residue entering the discharge channel 190 when the drying is still ongoing will return to the drying chamber 120 under the influence of gravity.

In one embodiment, a stirring device 161 may be provided within the drying chamber 120 near the intersection of the extension lines of the waste channel 170 and the discharge channel 190 (namely, the "microwave-illuminated area"), as residue tends to accumulate at this location.

In a second branch duct 520, a residue valve 530 may be provided, driven by a residue valve motor 540 to open and close. While the residue is being rotationally dried in the drying chamber 120, the residue valve 530 remains closed, preventing air and residue from exiting the drying apparatus 100 via the discharge channel 190 (even if residue enters the discharge channel 190, it will fall back into the drying chamber 120 due to gravity). During this time, air exits only through the first branch duct 510 and enters the exhaust gas filtering device 700. After the residue has been dried (e.g., when the humidity in the airflow drops below a preset threshold), the residue valve 530 opens, allowing the dried residue to enter the dried waste separation chamber 300 via the discharge channel 190 due to the presence of negative pressure through the second branch duct 520. At this point, air exits through both the first branch duct 510 and the second branch duct 520 and enters the exhaust gas filtering device 700.

In summary, the present disclosure provides an efficient organic waste disposal system that combines cyclonic drying, dust separation, and microwave drying to achieve rapid and environmentally friendly treatment of organic waste. Through a closed-loop design, the residue is maximally dried and processed within the drying chamber, ensuring that the final discharged airflow is free of dust, thereby significantly reducing odor emissions and improving the overall drying efficiency of the system.

Figure 2:
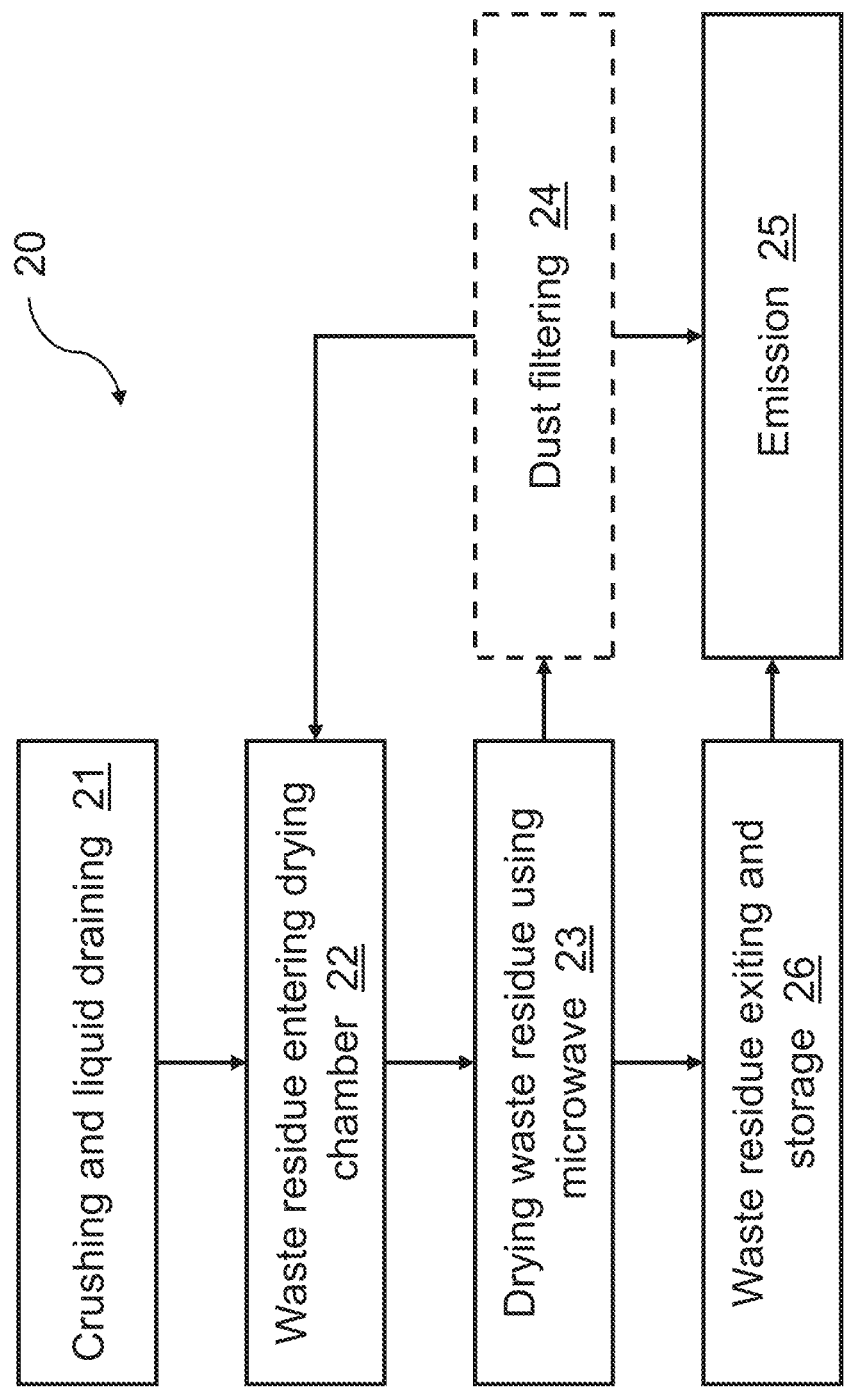
FIG. 2 is a flowchart of an organic waste disposal method according to one embodiment of the present disclosure.

Referring now to FIG. 2, it illustrates a flowchart 20 of a method for processing organic waste according to an embodiment of the present disclosure. The flowchart 20 describes how the system processes organic waste through multiple operations, including crushing, drying, dust separation, and final processing. Specifically, the flowchart 20 shows how the organic waste is pre-treated using a crushing device, and then the moisture in the organic waste is efficiently removed through the synergistic operation of the drying apparatus and the dust separation device, ultimately yielding dried organic residue.

First, in operation 21, the organic waste is crushed, and the free liquid is discharged. The crushing device pulverizes the larger organic waste into smaller pieces or residue, while the free liquid is expelled through the liquid outlet, thereby forming to-be-dried organic residue. Although this residue still contains a significant amount of moisture, the moisture is not in a free form and needs to be removed in subsequent operations through drying.

Next, in operation 22, the air pump operates to generate negative pressure, causing the intake airflow and the to-be-dried organic residue to be directed through the waste inlet into the drying chamber. The drying chamber has a circular cross-section, ensuring that the residue maintains rotational movement under the influence of a cyclone effect. The to-be-dried residue enters the drying chamber through the waste inlet and begins to rotate along the circular cross-section of the drying chamber.

In operation 23, the microwave generating device, which is directly coupled to the drying chamber or coupled via a microwave pathway, is operated. The microwaves generated by the microwave generating device are directed into the drying chamber to dry the residue as it rotates along the circumference of the drying chamber. The moisture in the residue rapidly evaporates under the microwave radiation, achieving an effective drying process. It should be understood that operation 23 can occur simultaneously with operation 22, during which the to-be-dried organic residue is directed to the drying chamber of the drying apparatus.

In operation 24, under the condition that the air pump generates negative pressure, the first airflow exits the drying chamber through the flow outlet and enters the dust separation device. The dust separation device separates the fine dust particles from the airflow to prevent these dust particles from entering the subsequent exhaust gas filtering device and causing odor issues. The settled dust particles can return to the drying chamber, forming a closed loop, ensuring that all dust particles are discharged together after the humidity has decreased to a certain level.

In operation 25, the first airflow, after passing through the dust separation device, enters the exhaust gas filtering device (typically a tank containing activated carbon and/or zeolite) to further purify the airflow by removing odors and impurities before being discharged into the atmosphere.

Finally, in operation 26, the dried organic residue is discharged through the residue outlet and stored in a storage chamber. The humidity sensor in the system can be used to detect the humidity of the first airflow and determine whether the moisture in the residue has been sufficiently removed. When the humidity sensor detects that the humidity of the airflow is below the preset threshold, the microwave generation can be stopped, and the residue outlet can be opened to complete the discharge and storage of the residue. It should be understood that the airflow from the discharged residue in operation 26 can also enters the exhaust gas filtering device to purification, as described in operation 25.

It should be understood that operation 24, in which the first airflow exits the drying chamber through the flow outlet and enters the dust separation device, can be optional, especially in cases where the to-be-dried residue is food waste (with less odor). In such cases, the first airflow can be directed straight to the exhaust gas filtering device for discharge.

Figure 3:
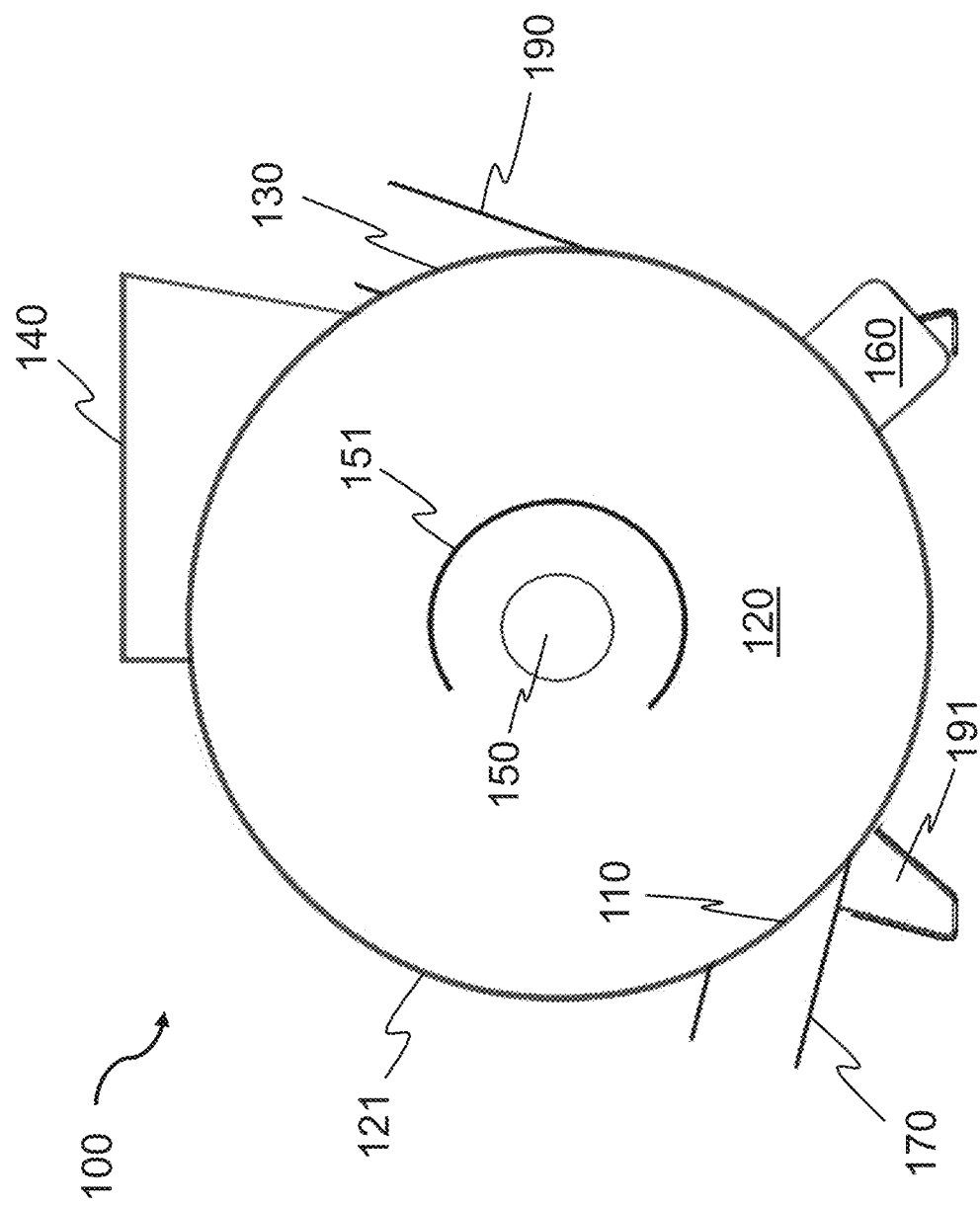
FIG. 3 is a schematic view of a drying apparatus according to one embodiment of the present disclosure.
Figure 4:
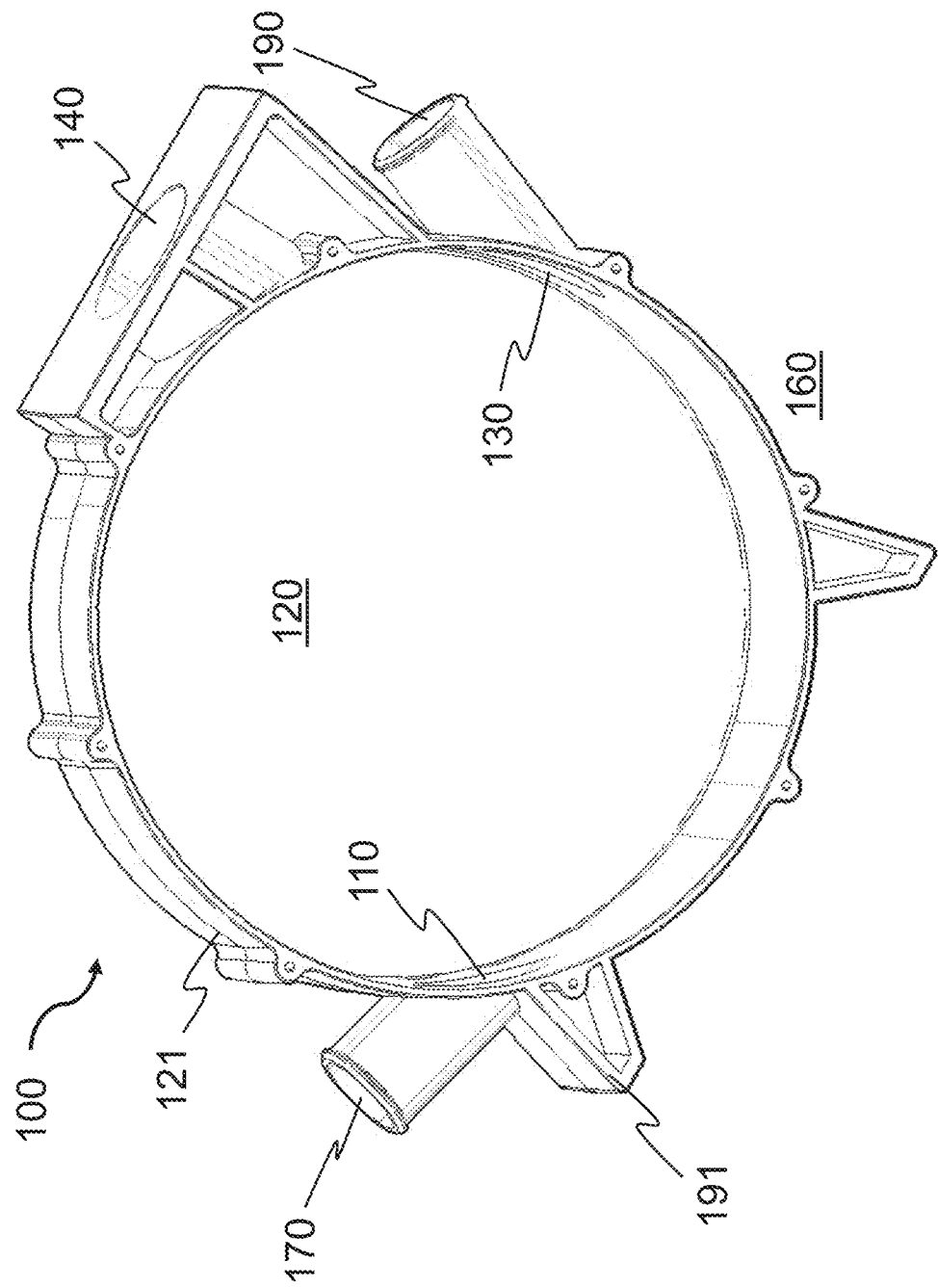
FIG. 4 is a perspective view of the drying apparatus shown in FIG. 3 from another angle.

FIG. 3 illustrates a schematic diagram of the drying apparatus 100 from FIG. 1 according to an embodiment of the present disclosure. FIG. 4 provides a perspective view of the drying apparatus 100. The drying apparatus 100 features a circular cross-section, enabling the residue to rotate cyclonically within it. Optionally, a semicircular baffle 151 can be arranged within the drying chamber 120 surrounding the flow outlet 150, with an opening provided in only one direction to allow airflow to pass through into the flow outlet 150. For example, as shown in FIG. 3, the semicircular baffle 151 has an opening positioned to face a location just above the waste inlet 110. This setup may further reduce the amount of residue carried by the rotating airflow in the drying chamber 120 that enters the flow outlet 150. The drying apparatus 100 may also be equipped with legs 191 to enable vertical placement, ensuring that the discharge channel 190 extends in a direction substantially opposite to gravity, as described above.

As shown in FIG. 4, the drying chamber 120 can be configured as a cylindrical body, with the flow outlet 150 positioned at the center of one of the two opposite surfaces of the cylindrical body (as shown in FIG. 3). It should be understood that the drying chamber 120 may also be shaped differently, such as with rounded edges like a "discus", spherical shape, or other shapes that maintain a circular cross-section at the maximum radius.

The drying apparatus in this embodiment of the present disclosure has several notable features and advantages. First, the drying apparatus utilizes a circular cross-sectional design, enabling the to-be-dried organic residue to maintain rotational movement in a cyclonic manner within the drying chamber. This design helps evenly distribute microwave energy, ensuring that the residue is fully dried within a short period, thereby enhancing the drying efficiency. Additionally, the apparatus integrates a waste inlet valve, allowing for the adjustment of the airflow speed entering the drying chamber as needed, thereby optimizing the rotation and drying process of the residue.

In terms of preventing dust residue from escaping, the drying apparatus effectively separates and recycles fine dust particles by incorporating structures such as a dust separation chamber and a semicircular baffle. This reduces the contamination of the exhaust gas filtering device by dust residue and lowers the likelihood of odor emissions. Moreover, the closed-loop design within the apparatus ensures that the residue remains in the drying chamber for processing until the humidity decreases to a predetermined value, further improving the drying effectiveness.

In terms of overall structure, the drying apparatus is designed for vertical placement, equipped with legs to ensure stability, and features a discharge channel layout that is oriented opposite to the direction of gravity, aiding in the efficient discharge of residue. This design not only simplifies the residue processing procedure but also ensures the efficient operation of the entire system. In summary, the drying apparatus disclosed herein offers a highly efficient, reliable, and environmentally friendly solution for organic waste processing, particularly suitable for handling organic residues with high moisture and odor content.

Figure 5:
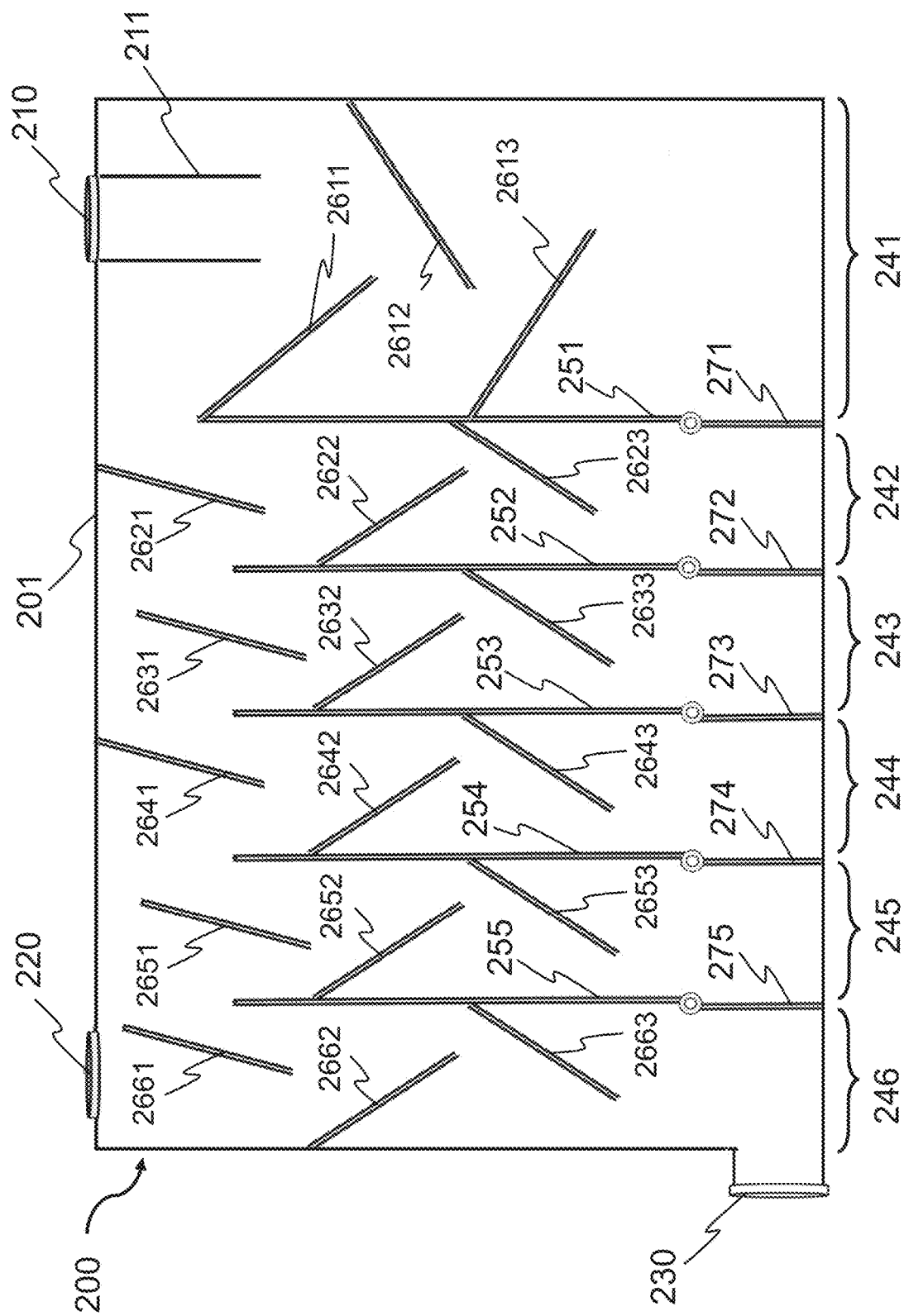
FIG. 5 is a schematic view of a dust separation device according to one embodiment of the present disclosure.
Figure 6:
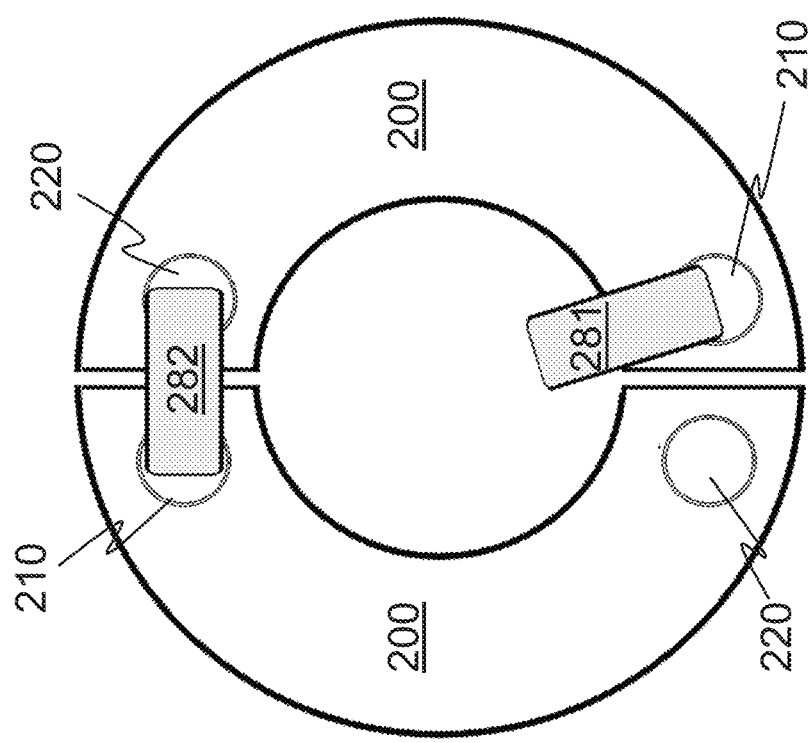
FIG. 6 is a top schematic view of two dust separation devices connected in series according to one embodiment of the present disclosure.

FIG. 5 illustrates a schematic diagram of the dust separation device 200 according to one embodiment. As described above, the dust separation device 200 is used to separate fine dust particles carried in the airflow. FIG. 6 shows two dust separation devices 200 arranged in series according to one embodiment.

The dust separation device 200 comprises a housing 201, which has an air inlet 210, an air outlet 220, and a dust outlet 230. The air inlet 210 and air outlet 220 are arranged near the top of the housing 201, with the dust separation air inlet 210 receiving airflow from the flow outlet 150 of the air duct. After passing through multiple stages of the dust separation device 200, the airflow exits from the dust separation air outlet 220. A dust outlet 230 is located near the bottom of the housing 201 and is used to discharge the dust that has settled at the bottom of the device.

Within the housing 201, a labyrinth structure with multiple stages (such as the first to the sixth stages 241-246) is arranged vertically. Adjacent stages are separated by baffles (such as the first baffle to the fifth baffle 251-255), forcing the airflow to change direction as it passes through each stage, causing dust to gradually settle at the bottom of each stage. Additionally, the outlet of each stage is positioned above the corresponding baffle and is in fluid communication with the inlet of the next stage. The inlet of the first stage is in fluid communication with the air inlet 210, while the outlet of the final stage is in fluid communication with the air outlet 220, ensuring that the airflow can be smoothly discharged after passing through multiple separation stages.

For example, the airflow may enter through the air inlet 210 and be directed to the first stage 241 via the inner section of the dust separation inlet duct 211. The first stage 241 is provided with the first stage's first deflector 2611, second deflector 2612, and third deflector 2613, ensuring that the dust particles fall to the bottom of the first stage 241 and do not escape from the top. Similarly, the second stage 242 can be provided with the second stage's first deflector 2621, second deflector 2622, and third deflector 2623; the third stage 243 can be provided with the third stage's first deflector 2631, second deflector 2632, and third deflector 2633; the fourth stage 244 can be provided with the fourth stage's first deflector 2641, second deflector 2642, and third deflector 2643; the fifth stage 245 can be provided with the fifth stage's first deflector 2651, second deflector 2652, and third deflector 2653; and the sixth stage 246 can be provided with the sixth stage's first deflector 2661, second deflector 2662, and third deflector 2663. The uppermost deflector in each stage may or may not be connected to the top, forcing the airflow to change direction or split at the top.

In one specific embodiment, a pivotable door (such as the first stage door to the fifth stage door 271-275) is provided beneath each of the baffles. These doors typically remain in a vertical orientation. However, when negative pressure is applied at the dust outlet 230, the doors will flip upward and abut against the adjacent baffle (such as the baffle of the next stage) or the housing (e.g., a separate tab provided on the housing, not shown), thereby forming a lateral dust channel at the bottom of the housing 201. This configuration facilitates the extraction of dust from the housing 201 through the dust outlet 230 under the influence of negative pressure. The dust outlet 230 may be equipped with a valve that controls the negative pressure by opening and closing.

In another embodiment, the air inlet 210 and air outlet 220 may be arranged on the top surface of the housing 201, while the dust outlet 230 is arranged on the side surface of the housing 201. This arrangement allows the dust particles to settle at the bottom as much as possible due to gravity, and when negative pressure is applied to the dust outlet 230, the dust particles can be directly extracted from the dust separation device 200 and returned to the drying chamber 120.

The housing 201 of the dust separation device 200 can be designed in specific shapes to allow for side-by-side installation with another dust separation device having the same structure and the ability to rotate 180° horizontally. For example, when multiple dust separation devices 200 need to be connected in series, they can be arranged side by side, with the air outlet 220 of the preceding dust separation device 200 connected to the air inlet 210 of the subsequent dust separation device 200. By connecting the air outlet 220 of one device with the air inlet 210 of another device through a connecting conduit 282, a dust separation assembly with at least two stages can be formed. The outer section 281 of the dust separation inlet duct serves as the upstream passage entering the dust separation device 200, connecting to the flow outlet 150. This modular design provides flexible installation and expansion options to meet different application requirements.

The housing 201 may be shaped as a rectangular prism or may have an arch-shaped design when viewed from above, as shown in FIG. 6, to accommodate different installation spaces and structural requirements. These design variations ensure that the dust separation device 200 is compatible and adaptable in various usage scenarios.

It should be understood that each dust separation device 200 can be designed in different shapes according to specific application requirements. These shapes include, but are not limited to, a rectangular prism, an arched shape when viewed from above (as shown in FIG. 6, where the top is shaped as an arch to accommodate components such as motors in the center), or other geometric shapes suitable for specific installation spaces. Additionally, the internal structure of the dust separation device 200 can also be flexibly adjusted, for example, each device can have a different number of stages to meet various separation requirements and airflow processing volumes.

The design of each stage can also be customized based on specific application needs. Specifically, the number of deflectors in each stage can vary to optimize the airflow direction and dust settling efficiency. The arrangement and orientation of the deflectors are not limited to the form shown in FIG. 5 and can be adjusted according to the characteristics of the airflow and the particle size of the dust. For example, deflectors can be inclined to enhance the rotational effect of the airflow, or different arrangements can be used to accommodate more complex airflow paths. This flexibility in design ensures that the dust separation device 200 can adapt to various environments and operating conditions, effectively handling different types and concentrations of dust, thereby further improving the overall performance and reliability of the system.

The dust separation device 200 can also be used as the dried waste separation chamber 300 for separating dried residue from the airflow, which then falls into the storage chamber 400 for storage. It should be understood that the dried waste separation chamber 300 may take other forms, such as a cyclone separator.

The dust separation device 200 in the embodiments of this disclosure achieves efficient separation of fine dust particles from the airflow through the design of a multi-stage labyrinth structure. The interior of the device is equipped with multiple deflectors and baffles, forcing the airflow to change direction at each stage, which promotes the gradual settling of dust at each stage's bottom. This graded processing method not only improves separation efficiency but also effectively reduces the residual dust in the airflow, ensuring that the airflow exiting the device is cleaner. The pivotable doors and negative pressure control mechanism within the device further optimize the dust discharge process, allowing the settled dust to be smoothly extracted from the dust outlet.

Additionally, the modular design of the dust separation device 200 provides flexible expansion capabilities. By connecting multiple dust separation devices in series, users can adjust the number of separation stages according to specific needs to meet different separation requirements and airflow processing volumes. At the same time, the diverse shape design of the housing 201 can meet various installation space requirements, ensuring the device's compatibility and adaptability in various usage scenarios.

These design features make the dust separation device 200 capable of operating independently in a single system, as well as being used as a dried waste separation chamber 300 within a system. The device's efficient separation capabilities and flexible application configuration provide strong support for the overall performance and reliability of the processing system, making it suitable for a variety of complex exhaust gas treatment and dust separation applications.

Figure 7:
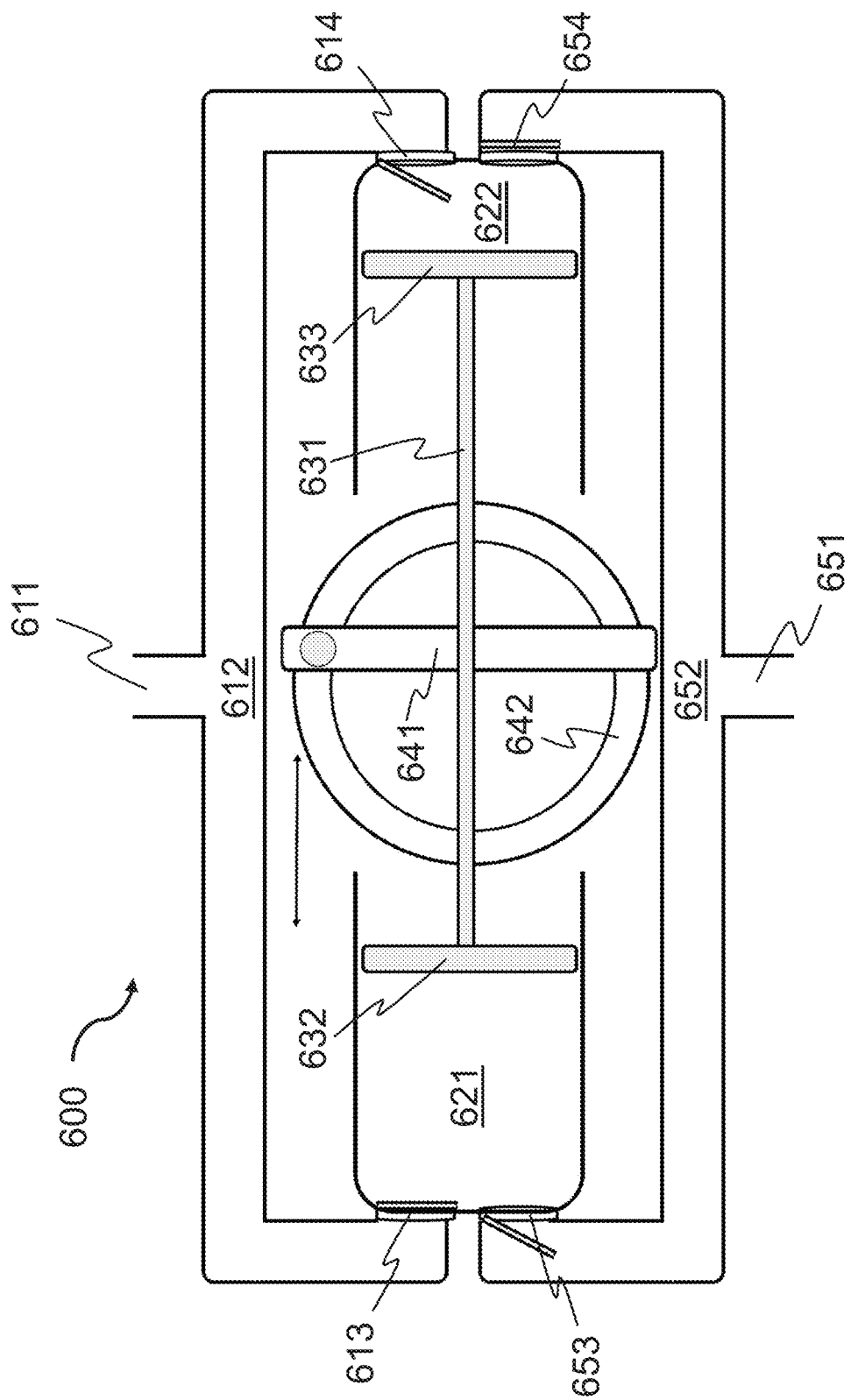
FIG. 7 is a schematic view of a dual-action pump for providing negative pressure according to one embodiment of the present disclosure.

FIG. 7 illustrates a schematic view of a dual-action pump 600 for providing negative pressure according to one embodiment of this disclosure. The air pump inlet 611 of the dual-action pump 600 receives airflow from the air duct 500. After the airflow enters the air pump inlet conduit 612, it is divided into left and right streams. The left stream enters the first pump cylinder 621 through the first pump cylinder inlet 613, while the right stream enters the second pump cylinder 622 through the second pump cylinder inlet 614. The first pump cylinder 621 is equipped with a first piston 632, and the second pump cylinder 622 is equipped with a second piston 633. The first piston 632 and the second piston 633 are rigidly connected by a connecting rod 631. Therefore, when the connecting rod 631 moves to the left, the volume of the first pump cylinder 621 decreases while the volume of the second pump cylinder 622 increases; conversely, when the connecting rod 631 moves to the right, the volume of the first pump cylinder 621 increases while the volume of the second pump cylinder 622 decreases.

The connecting rod 631 is slidably connected to a slider 641, which maintains a constant distance from the connecting rod 631 in the left-right direction but can slide relative to the connecting rod 631 in the vertical direction as shown in FIG. 7. The movement of the slider 641 is constrained by a circular track 642, thereby converting rotational motion into linear reciprocating motion of the pistons. This design ensures that the air pump can effectively perform dual-action compression to provide stable negative pressure, thereby maintaining airflow circulation in the system.

The gas in the first pump cylinder 621 can exit through the first pump cylinder outlet 653 and enter the air pump outlet conduit 652. Similarly, the gas in the second pump cylinder 622 can exit through the second pump cylinder outlet 654 and enter the air pump outlet conduit 652. The two airflow streams can then merge into a single stream before exiting through the air pump outlet 651.

In this embodiment, the first pump cylinder inlet 613 and the second pump cylinder inlet 614 are one-way valves, allowing flow to enter their respective pump cylinders but preventing flow in the opposite direction. Similarly, the first pump cylinder outlet 653 and the second pump cylinder outlet 654 are also one-way valves, allowing flow to exit the respective pump cylinders but not allowing flow in the reverse direction.

The dual-action pump 600 in this embodiment achieves efficient and stable negative pressure output through a well-designed system that features the coordinated operation of a dual-cylinder structure and a connecting rod-slider mechanism. By dividing the airflow into two streams that respectively enter the first pump cylinder 621 and the second pump cylinder 622, and through the synchronous compression and discharge provided by the rigidly connected first piston 632 and second piston 633, the pump ensures the continuity of airflow and the stability of pressure. Additionally, the combination of the slider 641 and the circular track 642 converts rotational motion into linear reciprocating motion, resulting in smoother and more efficient pump operation.

The main advantage of this dual-action design lies in its ability to provide continuous negative pressure without relying on complex control systems. The dual-cylinder structure allows one cylinder to compress the gas while the other cylinder is drawing in gas, thus maintaining a continuous airflow and reducing the impact of airflow fluctuations on system performance. Moreover, the one-way valve design further ensures unidirectional airflow, preventing backflow and enhancing the overall efficiency of the system.

Figure 8:
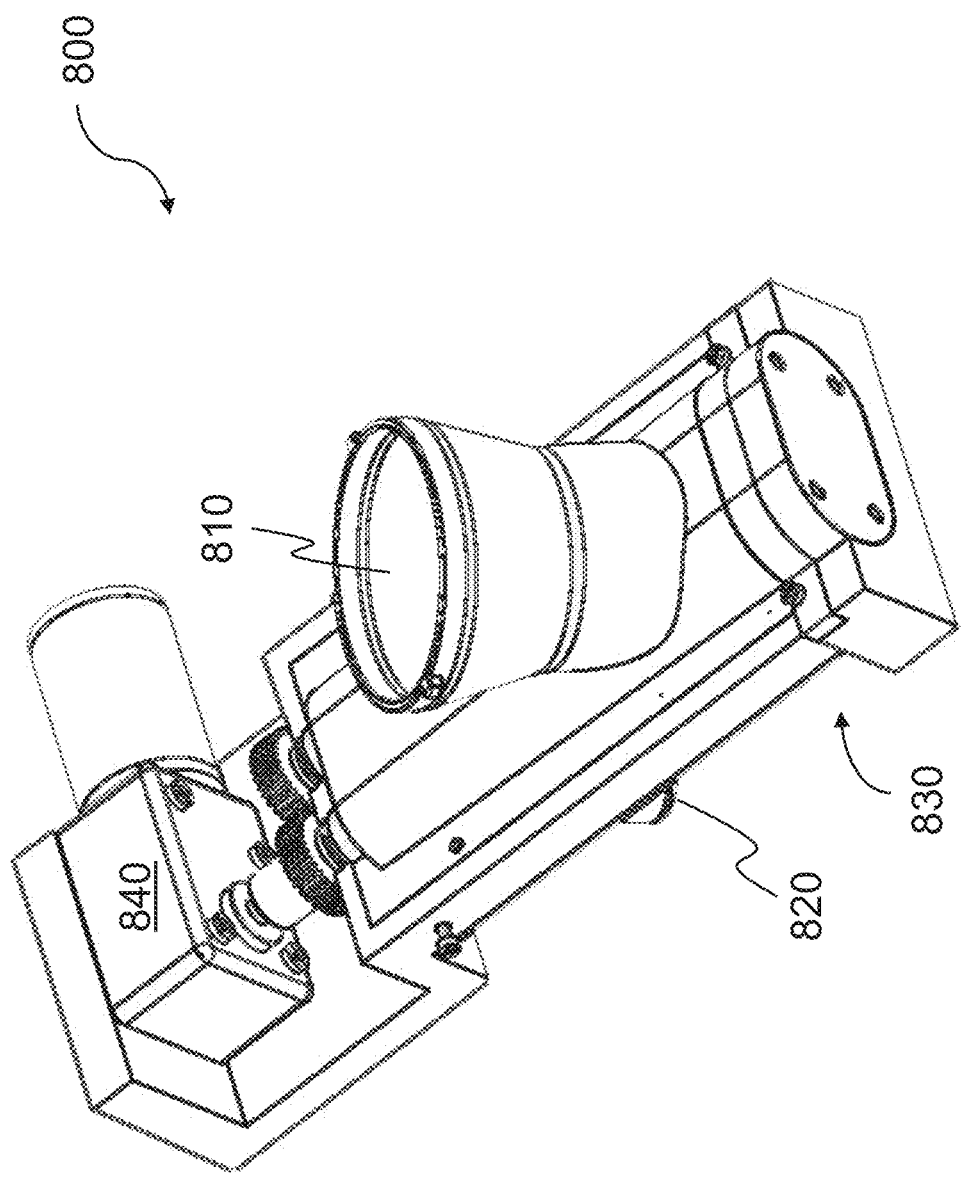
FIG. 8 is a perspective view of a crushing device according to one embodiment of the present disclosure.
Figure 9:
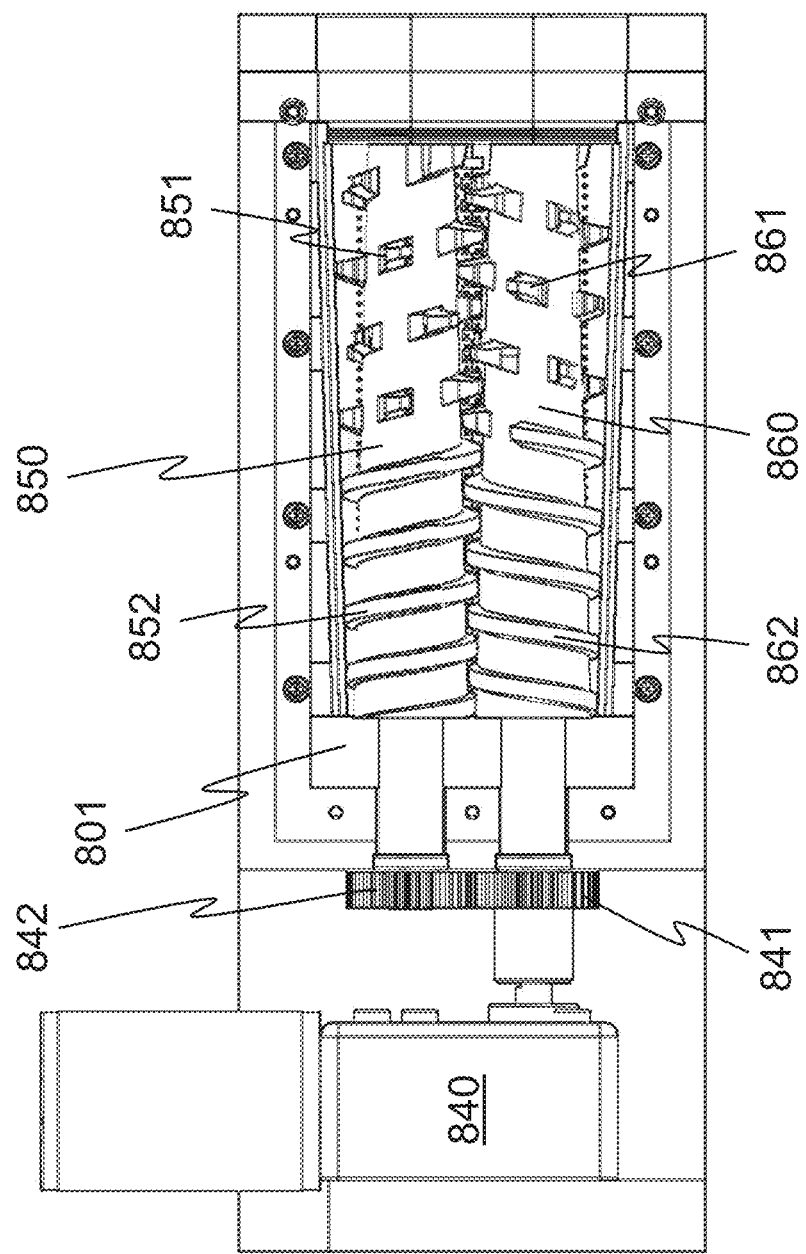
FIG. 9 is an internal structural view of the crushing device shown in FIG. 8.
Figure 10:
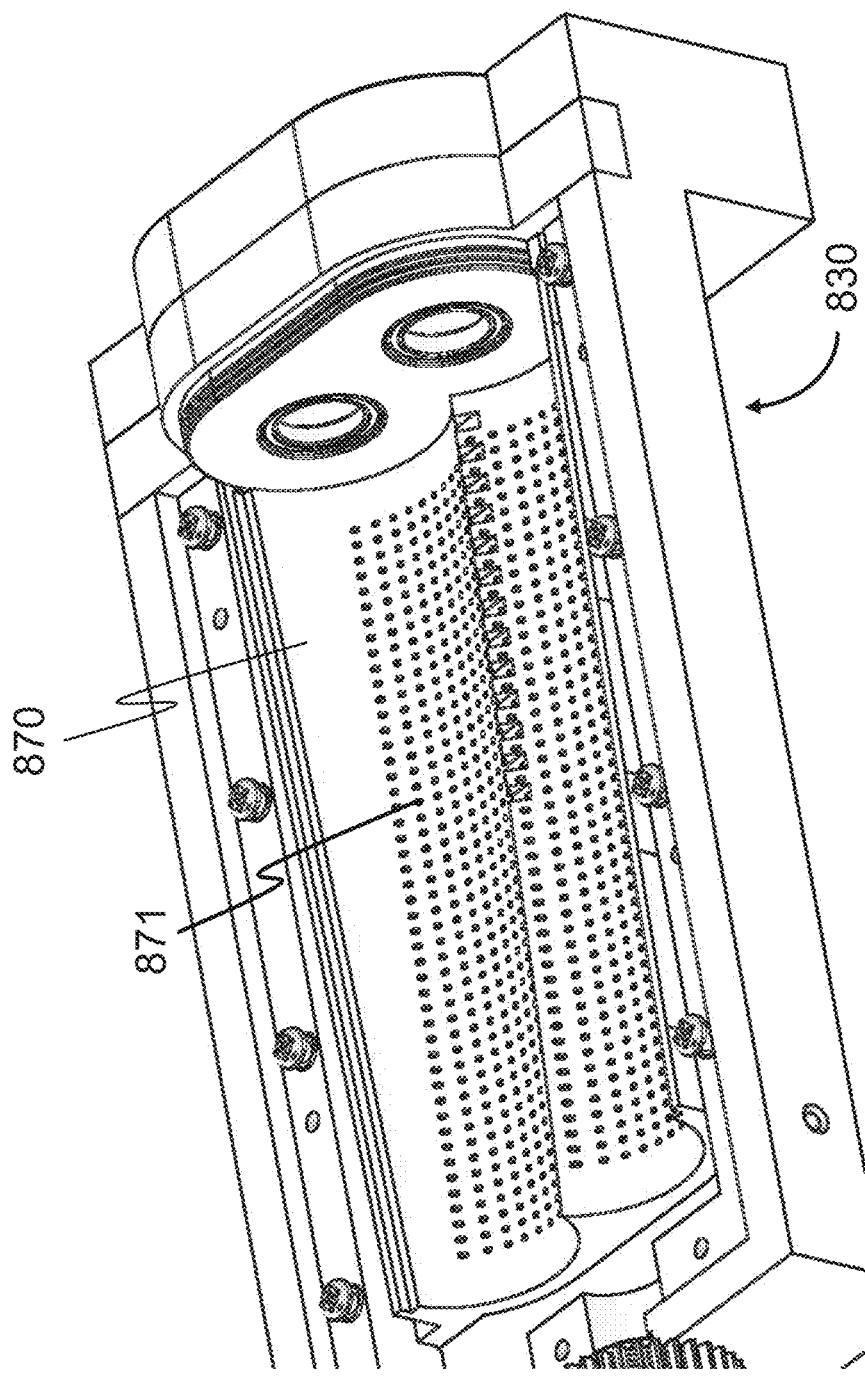
FIG. 10 is a partial perspective view of the crushing device shown in FIG. 8 after the removal of the two rotating shafts.

FIG. 8 is a perspective view of a crushing device 800 according to one embodiment of the present disclosure. FIG. 9 illustrates the internal structure of the crushing device 800 depicted in FIG. 8. FIG. 10 is a perspective view of a portion of the crushing device 800 shown in FIG. 8 after the removal of the two rotating shafts 850 and 860. The following description provides an explanation of the crushing device 800 based on these three figures.

The crushing device 800 includes a chamber 801, which is designed to separate liquid-containing organic waste into solid organic residue and free liquid. Waste is introduced into the chamber 801 through a solid inlet 810. Within the chamber 801, two parallel screw shafts 850 and 860 are arranged, with helical directions opposite to each other. The opposite rotational directions are achieved through the engagement of a first gear 841 and a second gear 842 of the crushing device. These two gears are rigidly coupled to their respective rotating shafts, with one of the gears driven by a motor 840 of the crushing device. The design of the screw shafts 850, 860 includes intermeshing teeth 851, 861 in the upstream portion, which effectively crush the organic waste entering the chamber 801 through the solid inlet 810 into smaller particles.

In the downstream portion of the screw shafts, the helical structure is configured with offset screws 852, 862 to compress the crushed organic waste. This compression process further separates the moisture from the waste, forming solid organic residue and liquid. The liquid flows toward a liquid outlet 830 under the influence of gravity, while the solid organic residue is guided to a residue outlet 820 by the rotation of the screw shafts 850, 860.

In one embodiment, the gap between the helices on the screw shafts 850, 860 is larger in the upstream portion than in the downstream portion. This design helps to better capture and crush the waste at the beginning of the process, while the tighter helical structure in the downstream portion ensures more effective compression and separation.

Additionally, the liquid outlet 830 is positioned near the upstream end of the two screw shafts 850, 860, while the residue outlet 820 is located near the downstream end. The residue outlet 820 is positioned higher than the liquid outlet 830 to ensure that during the processing, the liquid can naturally drain out through the bracket drainage holes 871 of the screw shaft bracket 870 (as shown in FIG. 10) under the influence of gravity, while the solid organic residue is effectively compressed and discharged from the chamber 801 through the residue outlet 820. This layout design ensures that the crushing device 800 can efficiently separate and process organic waste, making it suitable for various organic waste treatment scenarios.

The crushing device 800 in this embodiment features several notable design characteristics and advantages. Firstly, the two screw shafts 850, 860 inside the device rotate in opposite directions, a design that, through intermeshing gears, ensures an efficient waste crushing process. The larger gap in the upstream portion of the helical structure aids in better capturing and crushing the organic waste, while the tighter helical design in the downstream portion further optimizes the compression and liquid separation process. This tiered design guarantees the efficiency of crushing and separation, allowing the processed solid organic residue and free liquid to be effectively discharged through the residue outlet 820 and the liquid outlet 830, respectively.

Moreover, the layout of the crushing device 800 may be designed such that the liquid outlet 830 is positioned upstream near the inlet end of the screw shafts, ensuring that the liquid can naturally drain under gravity. The residue outlet 820 is located downstream, near the end of the screw shafts, and positioned higher than the liquid outlet, ensuring more thorough separation of liquid and solid during the waste treatment process. Additionally, the design of the bracket drainage holes 871 facilitates the smooth discharge of liquid from the chamber, while the solid organic residue is extruded from the chamber through the residue outlet 820. This design not only improves the separation efficiency of the device but also reduces liquid residue, ensuring the cleanliness and long-term stable operation of the device.

Figure 11:
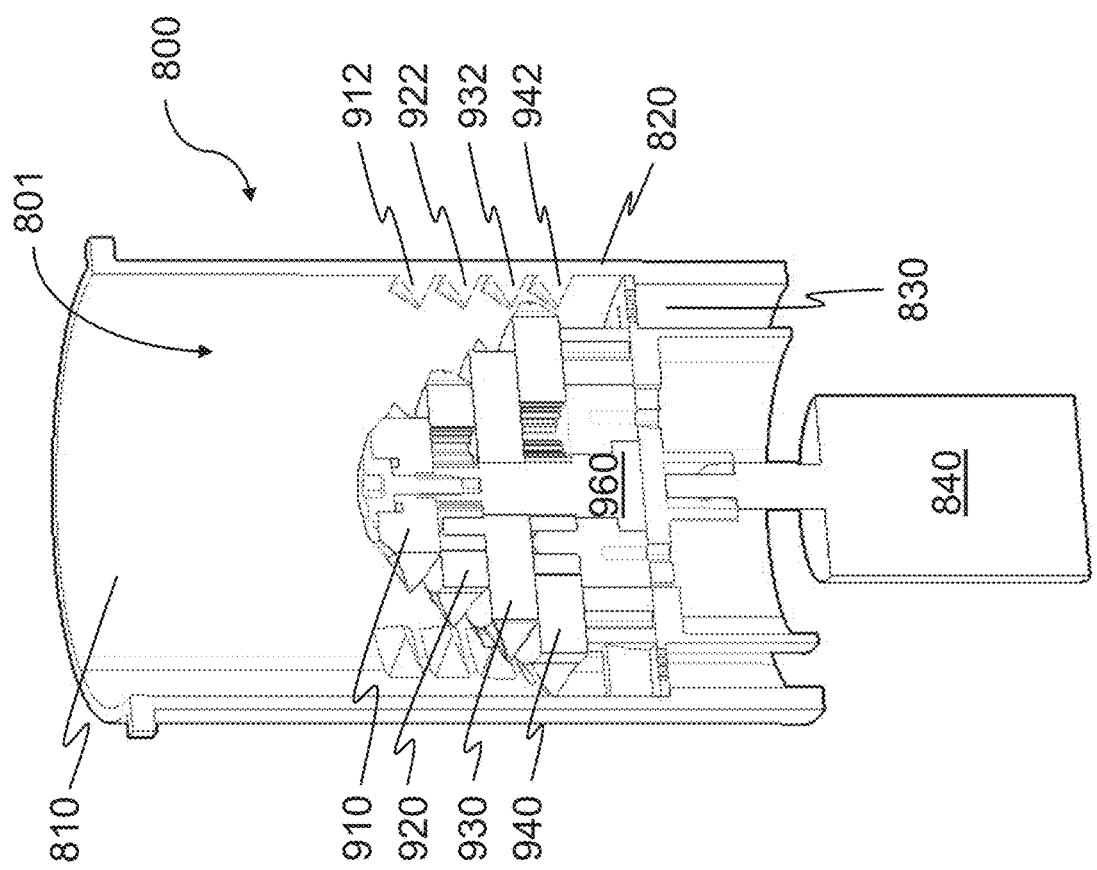
FIG. 11 is a sectional view of a crushing device according to one embodiment of the present disclosure.
Figure 12:
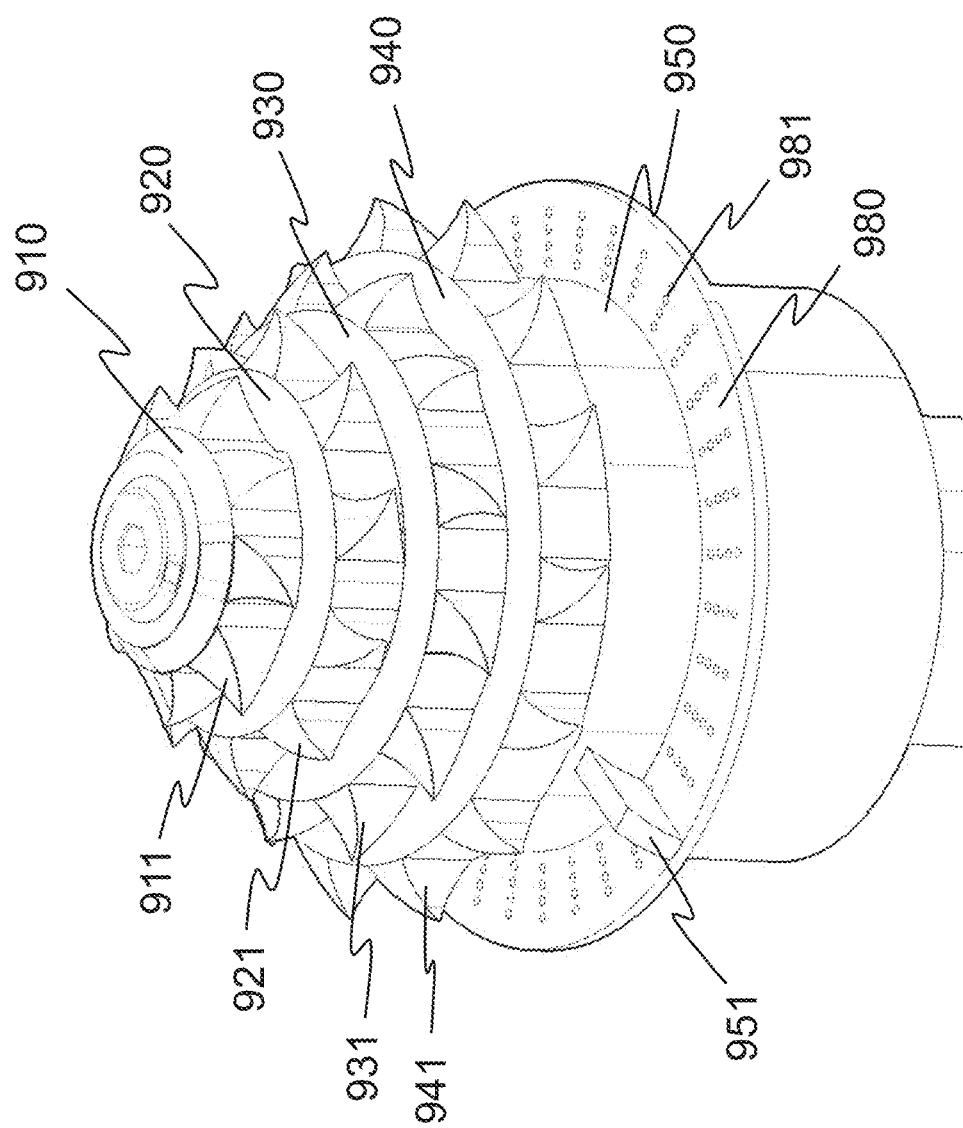
FIG. 12 is a perspective view of the crushing structure of the crushing device shown in FIG. 11.
Figure 13:
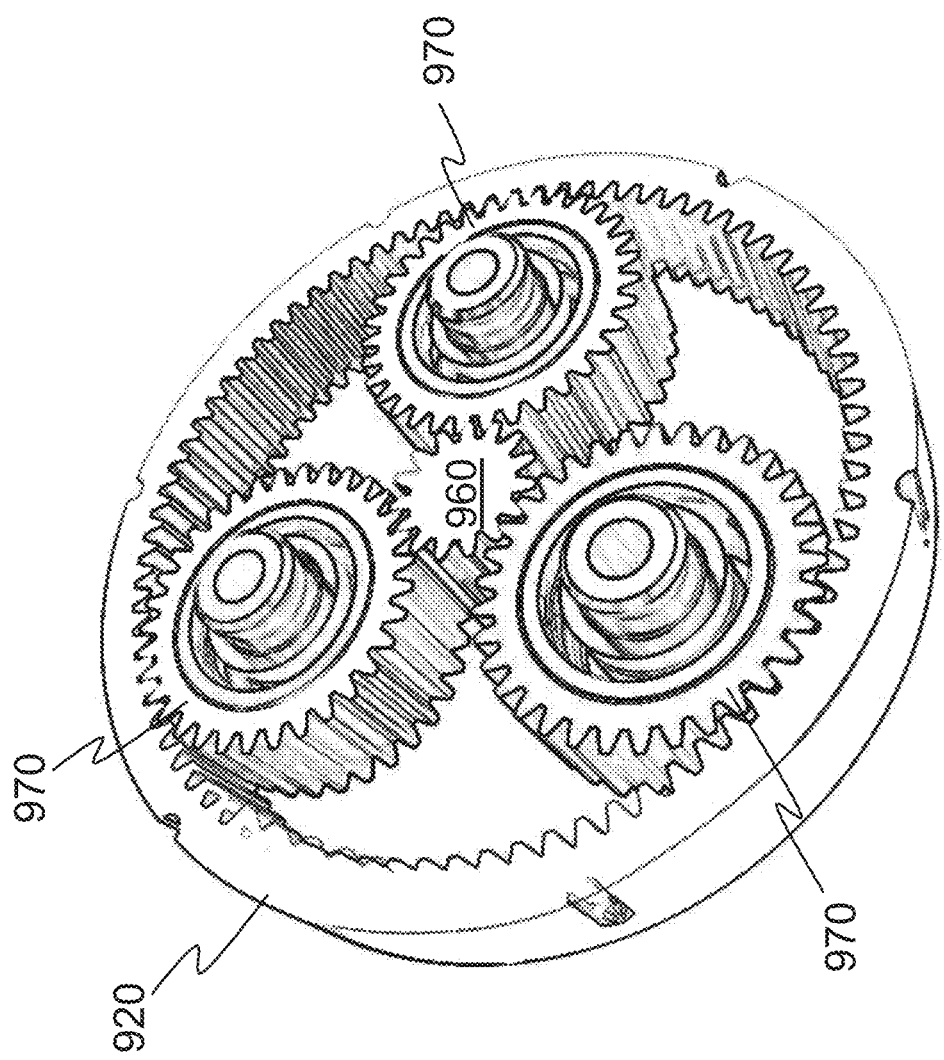
FIG. 13 is a view of the planetary gear structure of the crushing device shown in FIG. 11.
Figure 14:
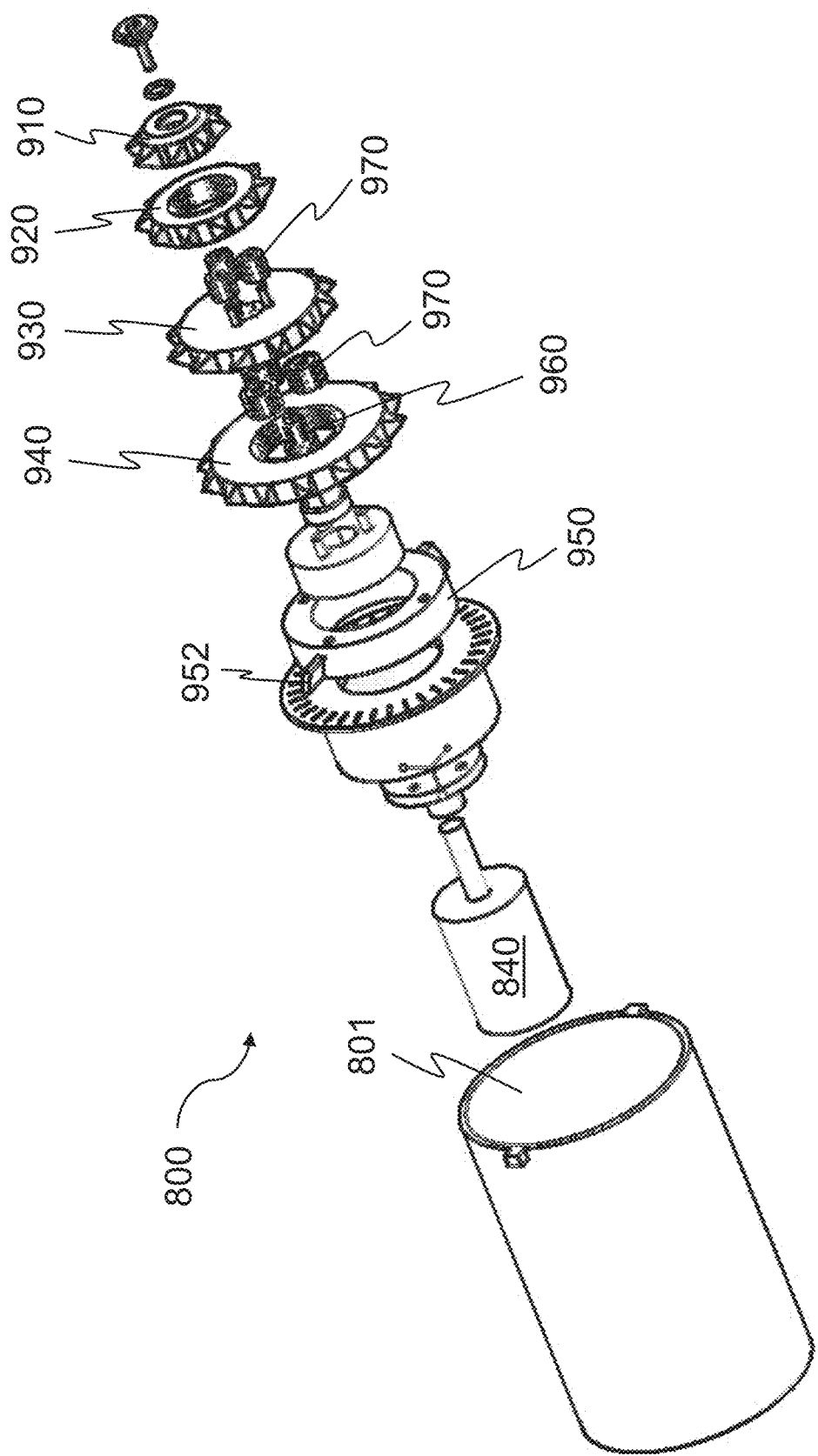
FIG. 14 is an exploded view of the crushing device shown in FIG. 11.

FIG. 11 is a cross-sectional view of the crushing device 800 according to another embodiment of the present disclosure. FIG. 12 is a perspective view of the crushing structure of the crushing device 800 shown in FIG. 11. FIG. 13 illustrates the planetary gear 970 structure of the crushing device 800 depicted in FIG. 11. FIG. 14 is an exploded view of the crushing device 800 shown in FIG. 11. The following description explains the crushing device 800 in conjunction with these four figures.

In this embodiment, the crushing device 800 includes a cylinder-shaped chamber 801, designed for processing organic waste, typically containing free liquid. Waste is introduced into the chamber 801 through a solid inlet 810 located above the crushing device 800. The chamber 801 is provided with a rotating shaft 960 along its axis, which is driven by a motor 840 and capable of rotating multiple discs 910-940. Each of the discs 910-940 may be coaxially mounted on the rotating shaft 960, and in the examples shown in these figures, each disc 910-940 is equipped with a set of disc teeth 911-941 on its circumference. It should be noted, however, that the number of disc teeth may vary and that they may only be present on some of the discs.

These disc teeth 911-941 engage with multiple wall teeth 912-942 arranged on the inner wall of the chamber 801 to achieve effective crushing of the organic waste. The wall teeth 912-942 generally correspond in number to the discs 910-940, with each layer of wall teeth 912-942 containing a specific number of teeth, radially arranged on the inner wall of the chamber 801, forming a multi-stage crushing structure. This multi-stage design ensures that the waste undergoes sequential crushing as it passes through the crushing device 800, allowing for thorough processing and reducing the likelihood of large particle residues.

In addition, each layer of wall teeth 912-942 can be designed with tips protruding in a specific direction. The direction of these tips is generally opposite to the direction of the disc teeth 911-941 on the corresponding discs 910-940 (as shown, for example, in FIG. 12). This opposite arrangement enhances the shear and compression forces generated when the discs 910-940 rotate. During the crushing process, as the waste is sheared and compressed between the rotating discs 910-940 and the stationary wall teeth 912-942, the relative motion of the tips and disc teeth 911-941 effectively enhances the crushing efficiency, especially for fibrous or tough waste materials. This design also helps to reduce material buildup and adhesion within the device, ensuring continuous and smooth operation of the crushing process.

Moreover, the tips on each layer of wall teeth 912-942 can be designed with different shapes and sizes based on the characteristics of the waste. For example, the tips can be conical, blade-shaped, or tooth-shaped, depending on the type of waste being processed. The layout of the tips can also be optimized as needed; for instance, the tips can be angled to guide the waste in a specific direction, thereby enhancing the crushing effect. Additionally, the inner wall of the chamber can be made from wear-resistant and corrosion-resistant materials to extend the device's lifespan and reduce maintenance costs. Each layer of disc teeth 911-941 may also be equipped with tips, as shown in FIG. 12.

Through the interaction of these carefully designed disc teeth and wall teeth, the crushing device of the present disclosure is capable of efficiently processing various types of organic waste while ensuring that the resulting organic residue has a uniform particle size, meeting the requirements for subsequent processing or use.

During operation, the rotating shaft 960 is typically oriented vertically to optimize the separation of waste and liquid. The multiple discs 910-940 have diameters that increase sequentially from top to bottom along the vertical direction. This design ensures that the waste is initially crushed by smaller diameter discs upon entering the chamber, followed by further crushing and compression by the larger diameter discs.

To enhance the crushing effect, adjacent discs 910-940 of the plurality of discs may rotate in opposite directions. This design helps to minimize potential clogging and adhesion issues that may arise during the crushing process. Additionally, at least one disc is engaged with the rotating shaft 960 via a set of planetary gears 970 (as shown in FIG. 13), such that the rotational direction of this disc is opposite to that of its adjacent disc, and their angular velocities differ. This planetary gear structure design further improves crushing efficiency and processing effectiveness.

Notably, when there are a total of two or three layers of discs, at least one disc is driven by the planetary gear structure, and when there are four layers of discs, at least two discs are driven by the planetary gear structure. The discs in this embodiment may have more or fewer than four layers.

Before, during, or after the crushing process, the separated liquid flows to the liquid outlet 830 under the influence of gravity. The liquid outlet 830 is typically located below the disc teeth 941 of the lowest disc 940. The residue outlet 820 may be provided on the side wall of the chamber 801, positioned below the lowest disc 940 and above the liquid outlet 830. The residue outlet 820 is designed to be operable (not shown), so that it remains closed during the crushing process to prevent the leakage of inadequately processed waste and opens after crushing is complete to discharge the crushed organic residue as the to-be-dried residue.

To effectively discharge the organic residue, the crushing device 800 may further include a rotating paddle disc 950 located below the lowest disc 940. The rotating paddle disc 950 is equipped with multiple paddles 951. When the residue outlet 820 is opened, the rotation of the paddle disc 950 can expel the organic residue from the chamber 801. Additionally, a sieve plate 980 may be provided below the rotating paddle disc 950, with several disc drainage holes 981. These holes allow free liquid to flow freely towards the liquid outlet 830 due to gravity, while retaining the organic residue on the sieve plate 980. As described earlier, when the residue outlet 820 is opened, the residue, driven by the rotation of the paddles 951, can be expelled from the chamber 801 and then directed through the waste channel 170 into the drying chamber 120.

This embodiment of the crushing device 800 combines the synergistic effects of multiple discs, disc teeth, and wall teeth to provide an efficient solution for organic waste processing. The device employs multiple vertically arranged discs to crush the waste in stages, ensuring thorough processing as the waste passes through the chamber. The arrangement of the discs and wall teeth, along with the shear and compression forces generated by their relative motion, significantly enhance the device's ability to handle fibrous and tough waste. The combination of discs rotating in opposite directions and the incorporation of a planetary gear structure further optimizes the crushing effect, reducing clogging and adhesion issues during processing, and ensuring the continuity and efficiency of the crushing process.

The layout of the device may be designed such that the liquid outlet 830 and the residue outlet 820 are strategically positioned, and the coordinated use of the rotating paddle disc 950 and the sieve plate 980, ensuring efficient separation and discharge of organic residue and free liquid. This design not only enhances the efficiency of waste processing but also ensures the smooth operation and reliability of the system.

Through these innovative designs, the embodiment of the crushing device 800 disclosed herein is adaptable to various organic waste processing scenarios, particularly where efficient separation and processing of liquid-containing waste are required, providing a solution with significant advantages. These features and benefits give the device broad application potential in waste processing systems.

It should be understood that various modifications, alterations, and adaptations may be made to the specific elements and configurations disclosed, including but not limited to dimensions, materials, positions, and operational mechanisms, without departing from the essence and scope of the disclosure.

The terminology used herein is only for the purpose of describing particular embodiments and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

It is contemplated that any part of any aspect or embodiment discussed in this specification can be implemented or combined with any part of any other aspect or embodiment discussed in this specification, so long as such those parts are not mutually exclusive with each other.

While every effort has been made to provide a detailed and accurate description of the disclosure herein, it should be noted that the scope of the disclosure is not limited to the exact configurations and embodiments described. The description provided is intended to illustrate the principles of the disclosure and not to limit the disclosure to the specific embodiments illustrated. It is intended that the scope of the disclosure be defined by the appended claims, their equivalents, and their potential applications in other fields.

What is claimed is:

1. A drying apparatus, comprising:
    a drying chamber having a substantially circular or polygonal cross-section, and including:
    a waste inlet for introducing an intake airflow and to-be-dried organic waste into the drying chamber, the waste inlet positioned radially offset from an axis of the substantially circular or polygonal cross section such that the to-be-dried organic waste cyclonically rotates around the axis;
    a flow outlet for discharging a first airflow, positioned on or adjacent to the axis of the substantially circular or polygonal cross-section; and
    a discharge outlet for discharging dried organic waste, and radially offset from the axis of the substantially circular or polygonal cross-section, wherein a discharge channel directly coupled to the discharge outlet is oriented to extend in a direction substantially opposite to gravity;
    an air pump fluidly coupled to the flow outlet and configured to generate a negative pressure in the drying chamber, thereby causing the intake airflow and the to-be-dried organic waste to enter the drying chamber through the waste inlet and to maintain a cyclonic rotational movement of the to-be-dried organic waste within the drying chamber, while the first airflow is drawn out of the drying chamber through the flow outlet; and a microwave inlet for coupling to a microwave generating device, the microwave inlet providing a microwave pathway into the drying chamber for microwaves to contact and dry the to-be-dried organic waste cyclonically rotating therein.

2. The drying apparatus of claim 1, wherein the drying chamber is cylindrically shaped, and the flow outlet is positioned at an axial center of one end of the drying chamber.

3. The drying apparatus of claim 1, further comprising:
an exhaust gas filtering device for receiving the first airflow, wherein the exhaust gas filtering device includes a tank containing at least one of activated carbon or zeolite for purifying the first airflow.

4. The drying apparatus of claim 1, further comprising:
a waste inlet valve disposed in a waste channel fluidly coupled to the waste inlet and configured to regulate a flow rate of the intake airflow entering the drying chamber through the waste inlet by an amount of opening.

5. The drying apparatus of claim 4, wherein, and the waste channel is oriented to extend in a direction substantially perpendicular to the discharge channel.

6. The drying apparatus of claim 5, wherein a stirring device is provided in the drying chamber at or adjacent to an intersection of extension lines of the waste channel and the discharge channel.

7. The drying apparatus of claim 5, further comprising:
a dried waste separation chamber fluidly coupled to the discharge channel configured to receive a second airflow and the dried organic waste, wherein the dried waste separation chamber further comprises:
a housing having an air inlet that is fluidly coupled to the discharge channel, an air outlet, and a dust outlet, wherein the air inlet and the air outlet are arranged at or adjacent to a top of the housing, and the dust outlet is arranged at or adjacent to a bottom of the housing; and
a labyrinth structure comprising a plurality of stages inside the housing,
wherein each of the plurality of stages comprises: a baffle extending upwards from the bottom of the housing and spaced from the top of the housing to define an airflow pathway to an adjacent stage; and at least one angled airflow deflector, and
wherein the plurality of stages comprises a first stage in fluid communication with the air inlet, and a last stage in fluid communication with the air outlet.

8. The drying apparatus of claim 7, further comprising:
a storage chamber coupled to the dust outlet of the dried waste separation chamber for receiving and storing the dried organic waste.

9. The drying apparatus of claim 4, further comprising:
a dust separation chamber fluidly coupled to the flow outlet and configured to receive the first airflow from the flow outlet, wherein the dust separation chamber comprises:
a housing having an air inlet that is fluidly coupled to the flow outlet, an air outlet, and a dust outlet, wherein the air inlet and the air outlet are arranged at or adjacent to a top of the housing, and the dust outlet is arranged at or adjacent to a bottom of the housing; and
a labyrinth structure comprising a plurality of stages inside the housing,
wherein each of the plurality of stages comprises: a baffle extending upwards from the bottom of the housing and spaced from the top of the housing to define an airflow pathway to an adjacent stage; and at least one angled airflow deflector, and
wherein the plurality of stages comprises a first stage in fluid communication with the air inlet, and a last stage in fluid communication with the air outlet.

10. The drying apparatus of claim 9, wherein a pivotable door is provided beneath the baffle and is configured to remain in a vertical orientation when no negative pressure is applied at the dust outlet, and to flip upward when the negative pressure is applied at the dust outlet to abut against an adjacent baffle or against the housing, thereby forming a dust channel at the bottom of the housing for drawing dust from the bottom of the housing through the dust outlet.

11. The drying apparatus of claim 9, wherein the dust separation chamber includes the dust outlet in fluid communication with the waste channel, such that dust can re-enter the drying chamber through the waste channel.

12. The drying apparatus of claim 11, wherein the dust separation chamber comprises a humidity sensor in communication with the first airflow.

13. The drying apparatus of claim 9, wherein the air inlet and the air outlet are arranged on a top surface of the housing, and optionally the dust outlet is arranged on a side surface of the housing.

14. The drying apparatus of claim 13, wherein the air inlet and the air outlet are positioned at opposite ends on the top surface of the housing.

15. An organic waste disposal system, comprising:
a crushing device for separating organic waste into organic solid residue and a free liquid; and
a drying apparatus connected to the crushing device, comprising:
a drying chamber having a substantially circular or polygonal cross-section, and including:
a waste inlet connected to a residue outlet of the crushing device for introducing an intake airflow and the organic solid residue into the drying chamber, the waste inlet positioned radially offset from an axis of the substantially circular or polygonal cross section such that the organic solid residue cyclonically rotates around the axis;
a flow outlet for discharging a first airflow, positioned on or adjacent to the axis of the substantially circular or polygonal cross-section; and
a discharge outlet for discharging dried organic waste, and radially offset from the axis of the substantially circular or polygonal cross-section, wherein a discharge channel directly coupled to the discharge outlet is oriented to extend in a direction substantially opposite to gravity;
an air pump fluidly coupled to the flow outlet and configured to generate a negative pressure in the drying chamber, thereby causing the intake airflow and the organic solid residue to enter the drying chamber through the waste inlet and to maintain a cyclonic rotational movement of the organic solid residue within the drying chamber, while the first airflow is drawn out of the drying chamber through the flow outlet; and
a microwave inlet for coupling to a microwave generating device, the microwave inlet providing a microwave pathway into the drying chamber for microwaves to contact and dry the organic solid residue cyclonically rotating therein.

16. The organic waste disposal system of claim 15, wherein the crushing device comprises:
- a cylindrical chamber comprising: a solids inlet, a liquid outlet; and the residue outlet;
- a rotating shaft arranged along an axis of the cylindrical chamber; and
- a plurality of discs coaxially mounted on the rotating shaft below the solids inlet and above the liquid outlet and the residue outlet, with at least one disc having a plurality of disc teeth on its circumferential perimeter,
- wherein a plurality of wall teeth are provided on an inner wall of the cylindrical chamber and are vertically offset with at least some of the disc teeth to crush the organic waste supplied through the solids inlet and form the organic solid residue and the free liquid, and
- wherein the organic solid residue is discharged through the residue outlet and the free liquid is discharged through the liquid outlet.

17. The organic waste disposal system of claim 15, further comprising:
- a waste inlet valve disposed in a waste channel fluidly coupled to the waste inlet and configured to regulate a flow rate of the intake airflow entering the drying chamber through the waste inlet by an amount of opening.

18. The organic waste disposal system of claim 15, wherein the drying chamber is cylindrically shaped, and the flow outlet is positioned at an axial center of one end of the drying chamber.

19. A method for disposing organic waste, comprising:
- crushing and dehydrating the organic waste to form organic solid residue and liquid;
- cyclonically rotating the organic solid residue in the drying chamber of a drying apparatus comprising:
  - a drying chamber having a substantially circular or polygonal cross-section, and including:
    - a waste inlet for introducing an intake airflow and the organic solid residue into the drying chamber, the waste inlet positioned radially offset from an axis of the substantially circular or polygonal cross section such that the organic solid residue cyclonically rotates around the axis;
    - a flow outlet for discharging a first airflow, positioned on or adjacent to the axis of the substantially circular or polygonal cross-section; and
    - a discharge outlet for discharging dried organic waste, and radially offset from the axis of the substantially circular or polygonal cross-section, wherein a discharge channel directly coupled to the discharge outlet is oriented to extend in a direction substantially opposite to gravity;
- an air pump fluidly coupled to the flow outlet and configured to generate a negative pressure in the drying chamber, thereby causing the intake airflow and the organic solid residue to enter the drying chamber through the waste inlet and to maintain a cyclonic rotational movement of the organic solid residue within the drying chamber, while the first airflow is drawn out of the drying chamber through the flow outlet; and
- a microwave inlet for coupling to a microwave generating device, the microwave inlet providing a microwave pathway into the drying chamber for microwaves to contact and dry the organic solid residue cyclonically rotating therein; and
- directing microwaves to the cyclonically rotating the organic solid residue thereby producing dried organic residue.

20. The method of claim 19, further comprising:
- in response to detecting that a humidity of the first airflow is below a predetermined threshold, opening the discharge outlet of the drying apparatus to discharge the dried organic residue.

\* \* \* \* \*